May 25, 1943.  H. T. AVERY  2,320,025
CALCULATING MACHINE
Filed Dec. 19, 1938  8 Sheets-Sheet 1

INVENTOR.
Harold T. Avery
BY
ATTORNEY.

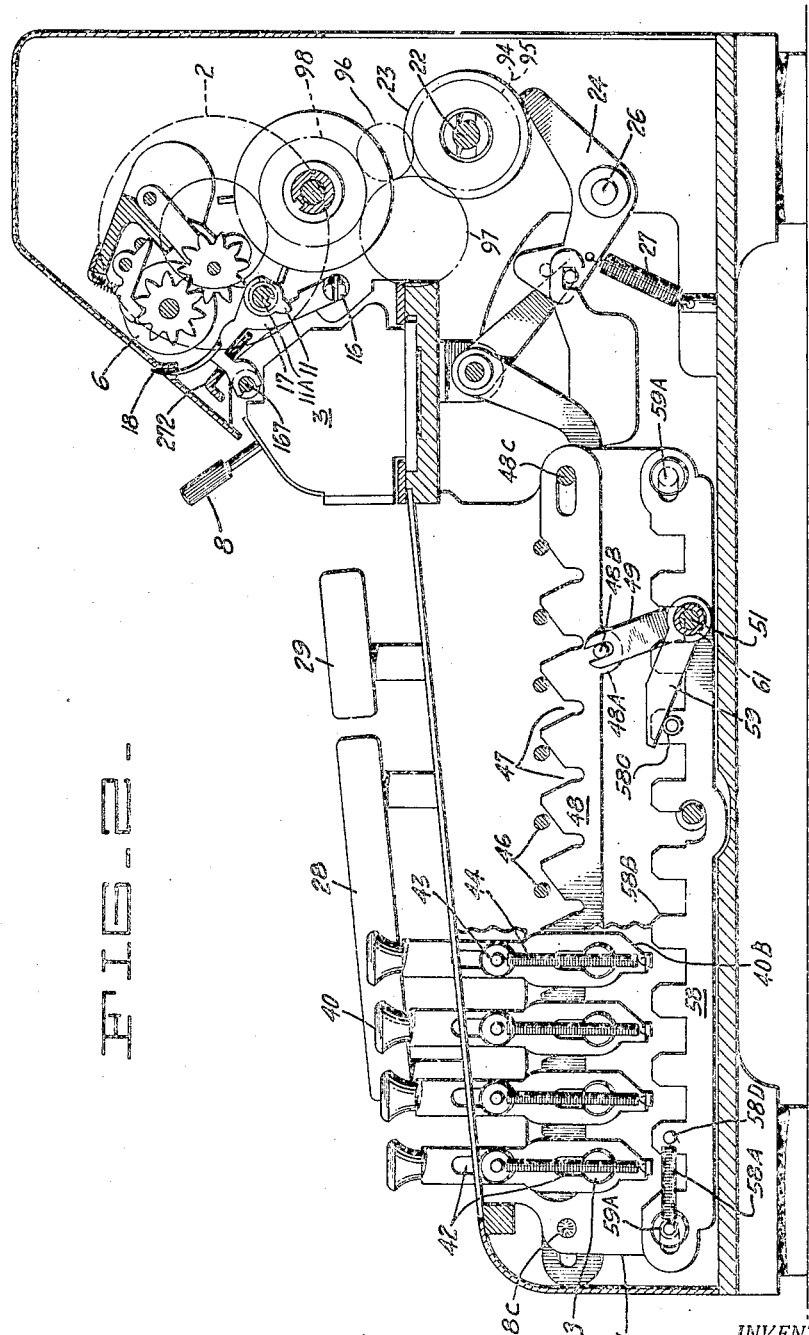

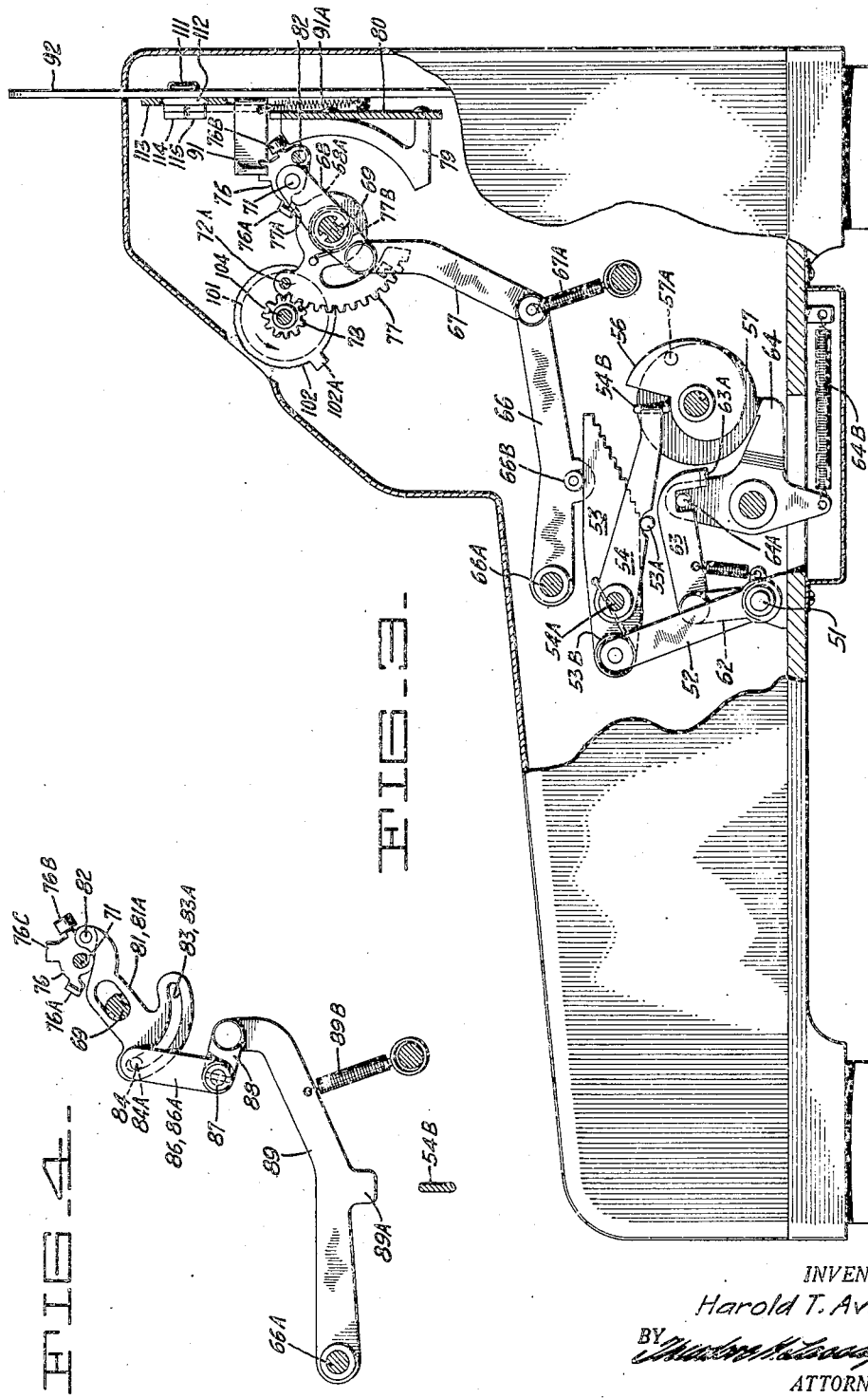

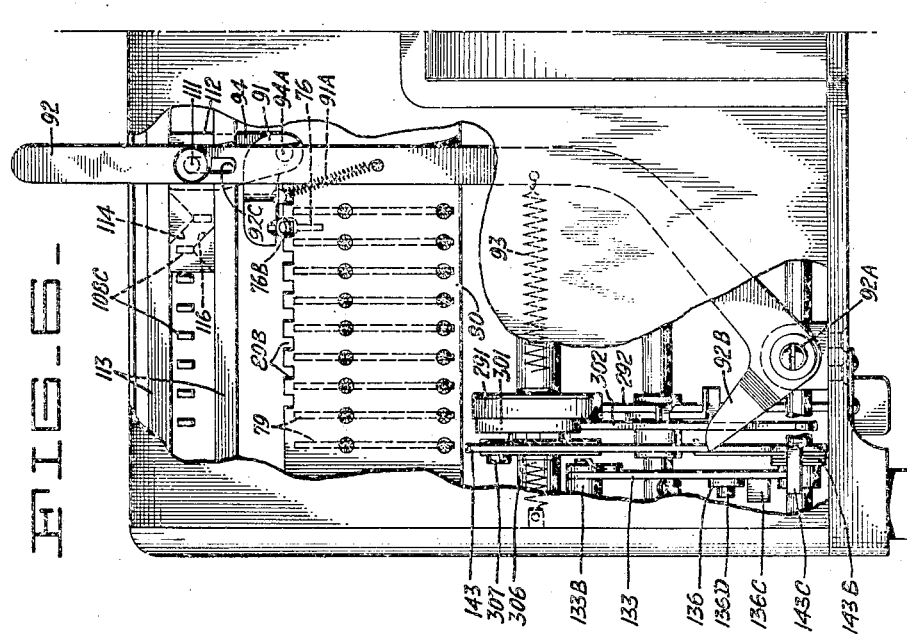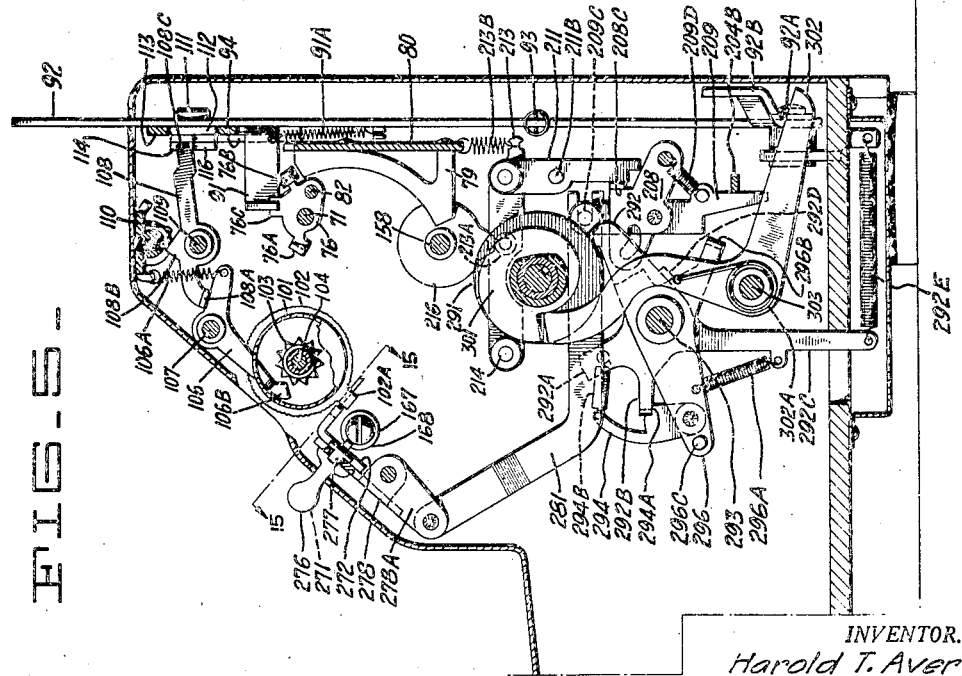

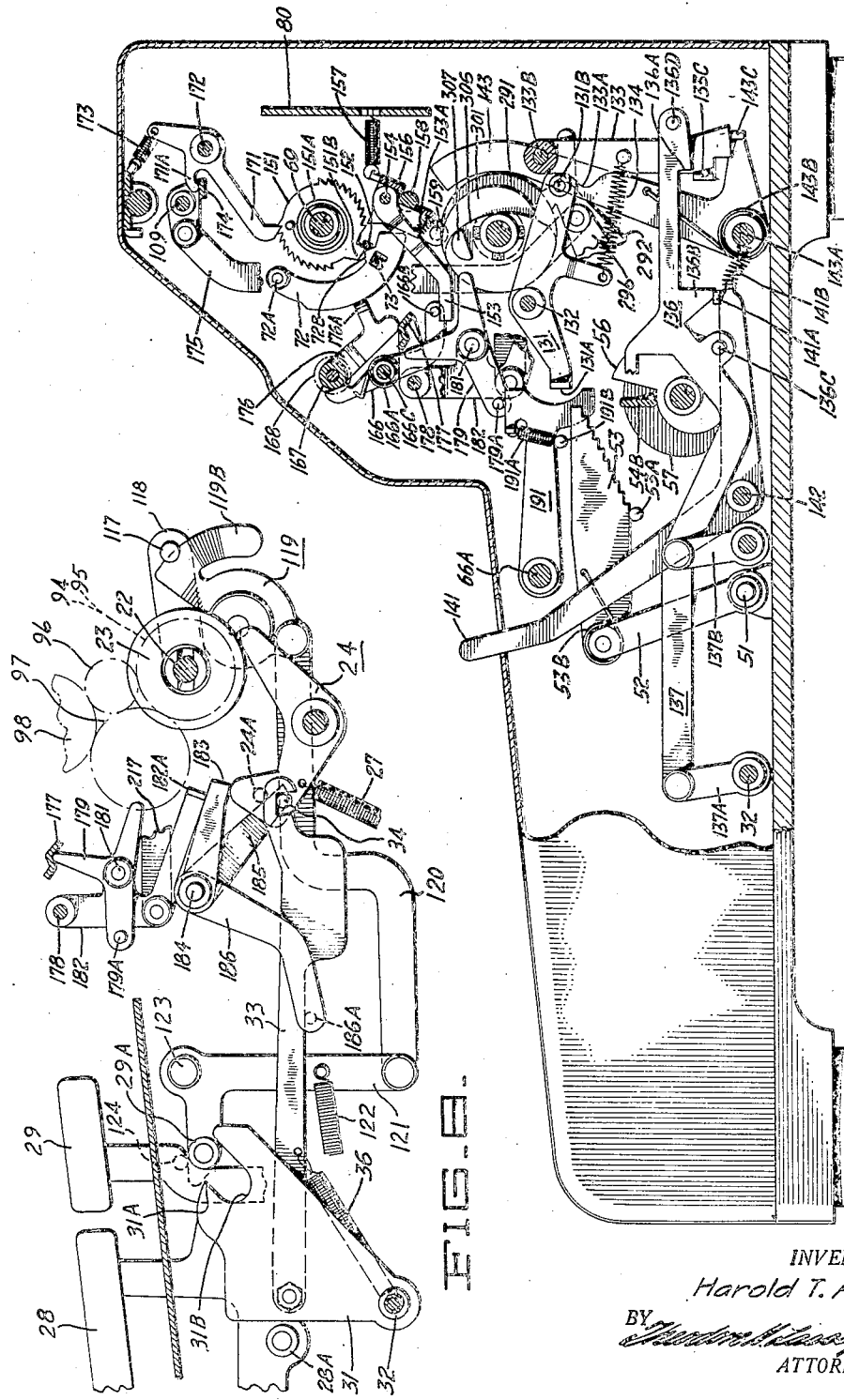

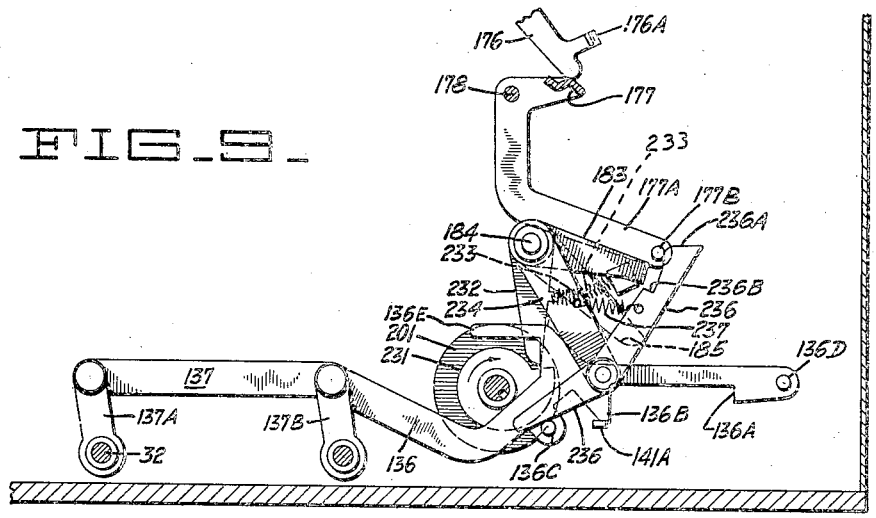
FIG_9_
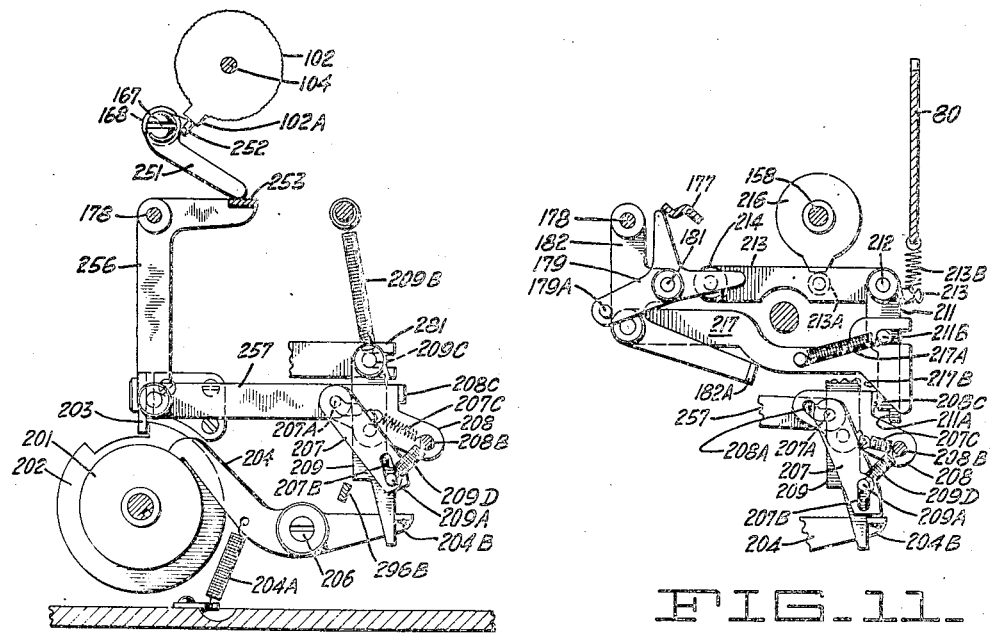
FIG_10_
FIG_11_
INVENTOR.
Harold T. Avery
BY
ATTORNEY.

May 25, 1943.  H. T. AVERY  2,320,025
CALCULATING MACHINE
Filed Dec. 19, 1938  8 Sheets-Sheet 7
FIG. 12.
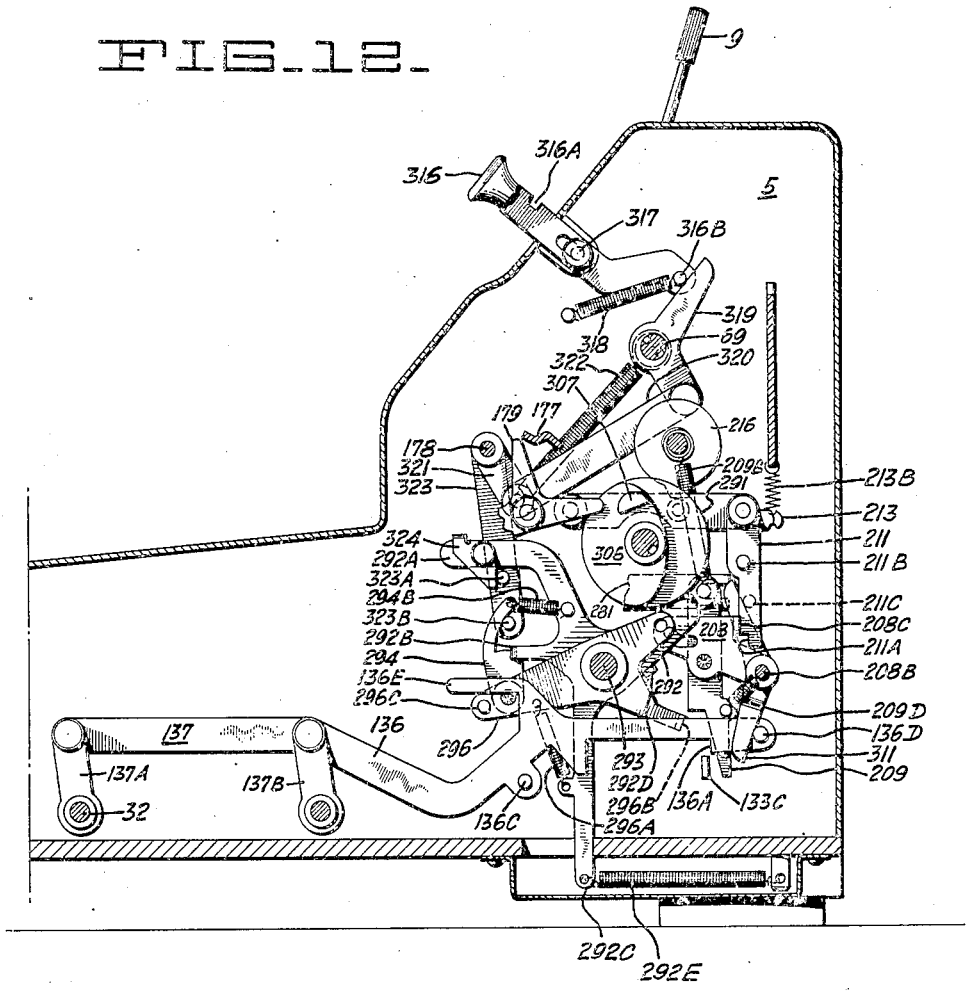
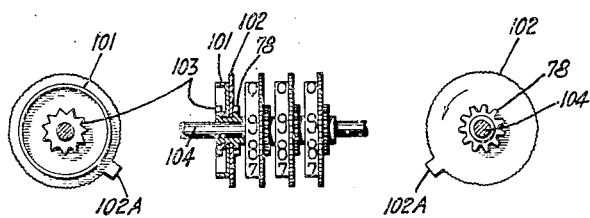
FIG 13  FIG 13A  FIG 13B
INVENTOR.
Harold T. Avery
BY
ATTORNEY.

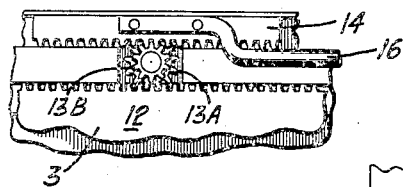
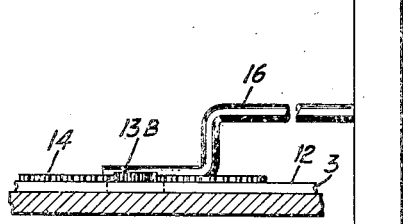
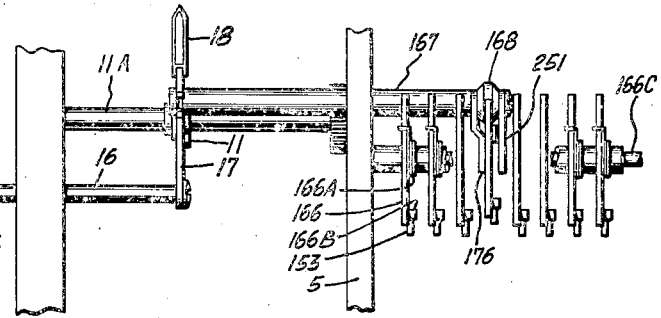
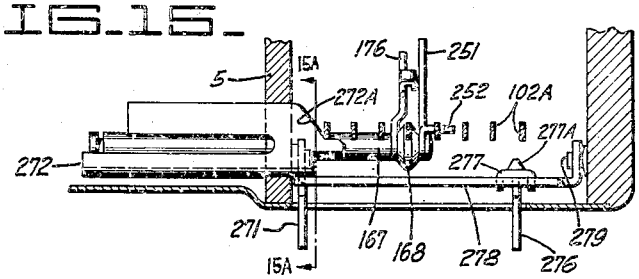
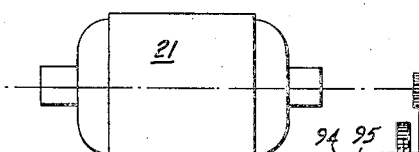
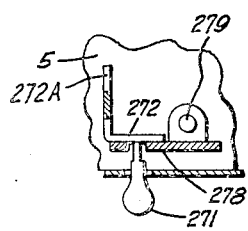
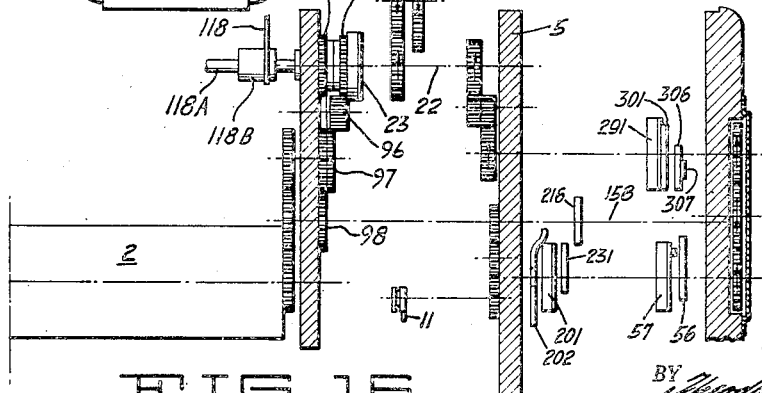

Patented May 25, 1943

2,320,025

UNITED STATES PATENT OFFICE 2,320,025

CALCULATING MACHINE

Harold T. Avery, Oakland, Calif., assignor to Marchant Calculating Machine Company, a corporation of California Application December 19, 1938, Serial No. 246,635

18 Claims. (Cl. 235—63)

The present invention relates to calculating machines of the type adapted to perform the four fundamental calculations and combinations thereof, and particularly concerns the type embodying means whereby multiplication operations are performed automatically.

The invention possesses many novel features which will be set forth in the following description of a machine of the type disclosed in the Friden Patent Number 1,643,710, dated September twenty-seventh, 1927; Friden Patent Number 1,830,161, dated November third, 1931; and the Friden Patent Number 2,142,892, dated January third, 1939, to which reference can be had for a disclosure of such mechanisms as are not specifically set forth herein.

Much of the mechanism shown in the present application is not only disclosed in the above cross references, but can be recognized in machines commercially produced and sold by the Marchant Calculating Machine Company, while the mechanisms believed to be new to the art are described in detail hereinafter.

It is an object of the invention to provide means whereby the multiplier may be introduced into the machine to control a predetermined plural order operation thereof in either a positive or negative multiplication.

Another object of the invention is the provision of a multiplying mechanism which is adapted to start operation upon depression of the first multiplier key by the operator, and to perform the successive ordinal multiplications as the factors are set therein, the mechanism being adapted to stop when it has performed the ordinal multiplications determined by the digits set therein by the operator and to restart upon the entry of a succeeding multiplier digit.

Another object of the invention is the provision of multiplying mechanism wherein the occurrence of one or more zeros in the multiplier will control the automatic carriage shifting operation without interruption until an order of the multiplier is reached in which a digit greater than zero has been set.

Another object of the invention is the provision of a multiplying mechanism whereby the operator can cause the machine to stop automatically after multiplication in any selected order and in which the operator can delay initiation of the operation until an independent starting control means is operated.

Another object of the invention is the provision of multiplying mechanism in which the orders of the multiplier selecting mechanism are adapted to be cleared individually or collectively while the machine is idle or operating.

Another object of the invention is the provision of a multiplying mechanism in which the multiplier is visibly displayed upon an indicator associated with the multiplier mechanism before and after the multiplication, as well as being registered on a revolutions counter during the operation.

Another object of the invention is the provision of a multiplier mechanism in which the multiplier can be retained optionally for use as many times as desired.

Another object of the invention is the provision of a multiplying mechanism in which the multiplying operation can be initiated in any ordinal position of the carriage.

Another object of the invention is the provision of multiplying mechanism including means whereby the termination of the operation can be automatically determined in any selected order.

Another object of the invention is the provision in a calculating machine of means for entering the product negatively into the accumulator register.

Other objects will appear during the following detailed description of a preferred form of the invention, reference being made to the accompanying drawings forming a part of the specification, in which—

Figure 2 is a longitudinal section through the machine, as viewed from the right, disclosing the multiplier keys and associated mechanism controlled thereby, the main clutch, and the revolutions counter.

Figure 3 is a right side view of the machine with a portion of the casing broken away to show the multiplier selection mechanism and the multiplier control unit set thereby.

Figure 4 is a detail view of the means for disengaging the shiftable setting member after it has set a number into one order of the multiplier control unit.

Figure 5 is a partial section through the machine, as viewed from the right, showing the return clutch for returning the shiftable setting member to initial position and the right tabulator stop for terminating operation of the machine.

Figure 6 is a partial rear elevation of the machine with a portion of the casing broken away to disclose the controlling mechanism for the shiftable setting member.

Figure 7 is a longitudinal section through the machine, as viewed from the right, showing the means for restarting the main clutch after a shifting operation, the shift clutch and the settable member for determining whether the machine will start upon depression of a multiplier key or by depression of the plus or minus key.

Figure 8 is a detail view from the right showing the means for engaging the main clutch, the reverse mechanism, and the connection from the minus key thereto.

Figure 9 is a detail view from the right of the controlling means for the restart clutch.

Figure 10 is a detail view from the right of the shift clutch and the selectively operable control means therefor.

Figure 11 is a detail view from the right of certain control mechanisms for the shifting clutch, the parts being shown in the positions occupied at full cycle position of the main clutch.

Figure 12 is a partial section through the machine, as viewed from the right, showing the repeat key and the mechanism controlled thereby to determine repeated operation with the same multiplier figure.

Figure 1:
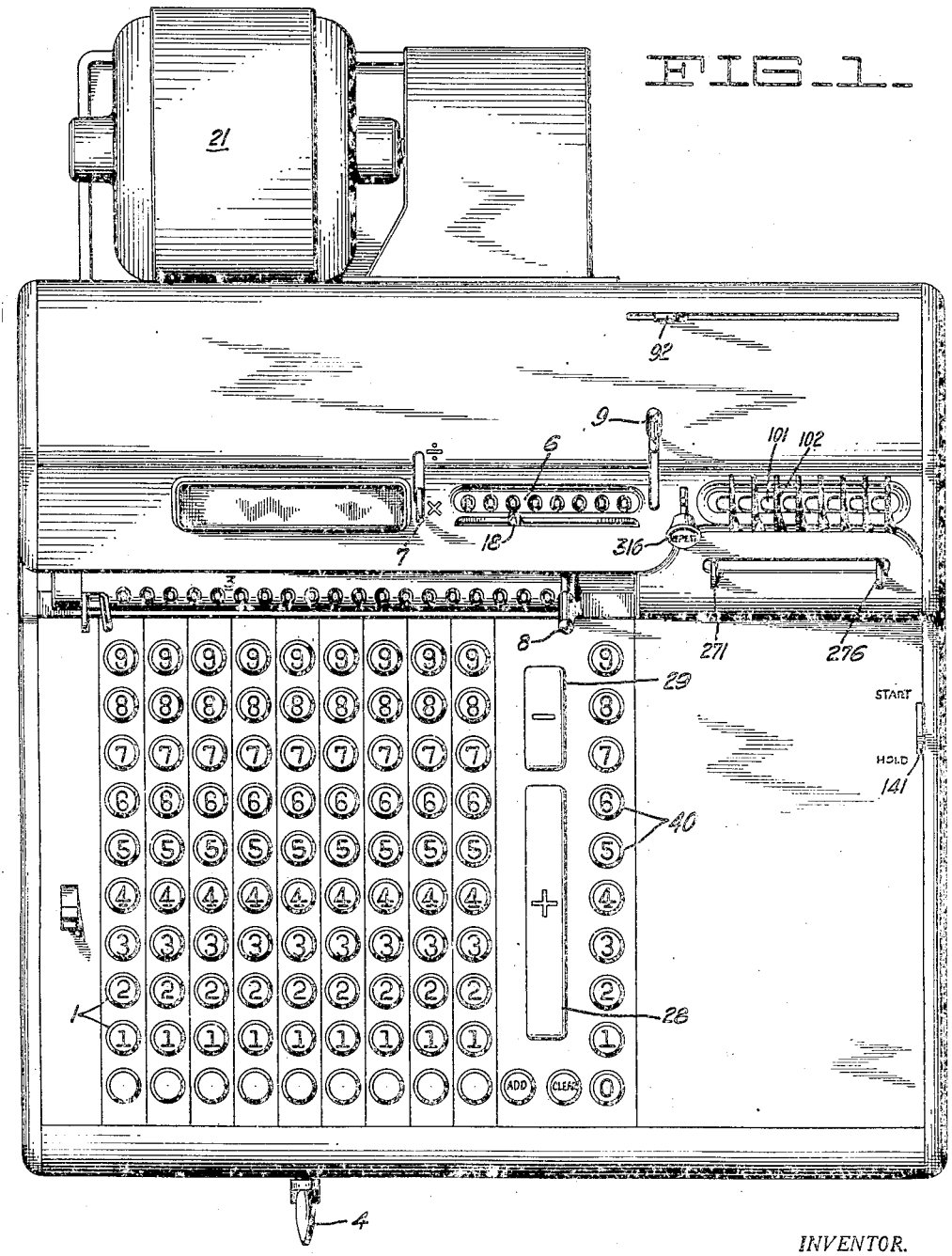
Figure 1 is a top exterior view of the calculating machine.

Figures 13, 13A, and 13B are leftside, front, and rightside views, respectively of the multiplier dial assemblies.

Figure 14 is a partial front elevation showing the control means for determining the type of operation in each order as controlled by the multiplier control unit.

Figure 14A is a detail view disclosing the means whereby the shiftable control mechanism is shifted by the carriage in the opposite direction to the movement thereof.

Figure 15 is a view taken on the line 15—15 in Figure 5, disclosing the right and left tabulating stops and the control exercised thereby.

Figure 15A is a section taken on line 15A—15A of Figure 15, showing the left tabulating stop.

Figure 16 is a schematic view of the driving mechanism of the calculating machine.

The mechanism disclosed herein eliminates many disadvantages in machines heretofore known and provides a multiplying mechanism which is very flexible in its operation, and which each operator may adapt to his own particular mode of operation and the particular problem which it is desired to solve.

In the present invention the multiplier control dials can be set directly by the operator, or he may use a bank of ten multiplier keys which control power operated selecting mechanism. The factor may be set in any selected orders of the multiplier control dials so that the entry of the product into the accumulator will correspond to the ordinal position of a factor standing therein to which it is desired to add the product. In case of error the machine may be stopped in any desired order to permit correction of the set up therein. Another feature of the instant mechanism is that it is adapted to start the calculating operation upon entry of the first multiplier factor therein if the operator so desires, or he may enter the entire factor or any portion thereof, and then start the calculation. In the latter type of operation, means are provided whereby the operator may determine an entry of the product in the accumulator in a negative sense; that is, it may be subtracted from any number standing therein.

Another advantage obtained by the mechanism disclosed, is that any desired multiplier factor may be retained for repeated operation as many times as is desired, and the multiplier factor is at all times visibly displayed on one or more series of dials. Another advantageous feature is that when the machine is stopped at any time during an operation, or at the end of an operation and then started, the machine automatically takes up the operation where it stopped and reconditions the machine for a subsequent operation. Thus the attention that need be paid to the mechanism by the operator to secure correct operation is reduced to a minimum.

*Differential mechanism, actuators, and registering mechanism*

The numeral keys 1 (Figure 1) are adapted to control selecting mechanism of the type disclosed in the above mentioned Friden Patent Number 1,643,710, to enter the values set therein in the actuator 2, diagrammatically shown in Figures 2 and 16. As a specific description of such mechanism is not essential to an understanding of the instant invention, reference is therefore made to the above mentioned patent for a detailed description thereof. Upon rotation of the actuator 2 the value set therein is transmitted to the aligned registering wheels of the shiftable accumulator mechanism 3 (Figures 1 and 2). The accumulator is mounted in a shiftable carriage which may be displaced to any desired ordinal position by manipulation of the shifting handle 4, as fully disclosed in the above mentioned patent.

The number of actuations occurring in each order is registered in the revolutions counter 6 (Figures 1 and 2) which is provided with suitable tens carrying mechanism. The counter 6 can be actuated in the same direction or reversely with respect to the direction of actuation of the accumulator 3, as determined by the adjustment of the reversing control lever 7. The revolutions counter actuator 11 (Figure 2) is mounted for rotation with its driving shaft 11A and is shiftable thereon to be positioned opposite a selected order of the revolutions counter by means connected to the shiftable accumulator carriage 3. A rack 12 (Figures 14 and 14A) secured to the base plate of the shiftable carriage 3 meshes with a gear 13A fixed in the machine frame. Integral with said gear 13A is a second gear 13B, which meshes with a rack 14, which is adapted to slide in suitable guides in the frame of the machine. Thus it is seen that the direction of movement of the rack 14 is opposite to that of the rack 12 so that a rod 16, secured to said rack 14 and carrying a support 17 (Figures 2 and 14) on which is formed a fork, which engages the counter actuator 11 and carries the ordinal indicator 18, is always in the same relative ordinal position with respect to the revolutions counter as the shiftable accumulator is with respect to the accumulator actuator 2.

Suitable zero resetting means are provided for the accumulator 3 and the revolutions counter 6, such mechanisms being controlled by the levers 8 and 9 respectively, and being of the type disclosed in the patent to Heinitz Number 670,075, dated March nineteenth, 1901.

*Driving mechanism*

In the present embodiment, the driving mechanism comprises an electric motor 21 (Figures 1 and 16), which is connected by suitable speed reducing mechanism to the drive shaft 22 (Figures 2 and 16, and is adapted to be intermittently connected to the calculating mechanism to drive the same. The means whereby the drive is connected to the calculating mechanism includes a clutch 23 (Figures 2, 8, and 16) of the type disclosed in Figure 11 in Friden Patent Number 1,643,710, and which is controlled by a bellcrank member 24, journaled on the stub shaft 26, and provided at one end with a foot adapted to enter the clutch housing when said housing is in full cycle position and abut an element therein to disengage the clutch. A spring 27 (Figures 2 and 8) tensioned between a stud on the machine base and the left arm of bellcrank 24, tends to urge the foot counter-clockwise to clutch disengaging position.

Manually operable means are provided for operating the bellcrank 24 (Figure 8) to determine engagement of the clutch for the number of rotations of the actuator requisite to perform a desired calculation. Said means comprise the plus key 28 and the minus key 29 (Figures 1 and 8), the details of the construction and the mounting of which are fully disclosed in the aforementioned patent to Friden Number 1,830,161. For the purpose of the present description, it is sufficient to understand that upon depression of the respective keys, rollers 28A and 29A (Figure 8) are adapted to cause clockwise rocking of a control plate 31 pivoted at 32. Such clockwork rocking causes rightward movement of the control link 33 which is provided at its right end with a notch, which engages a pin 34 on the left arm of the bellcrank 24, so that such rightward movement rocks said bellcrank to clutch engaging position. The control link 33 is normally held in position overlying the pin 34 by a spring 36 tensioned between supporting shaft 32 and an intermediate point on the control link.

Means are provided to selectively effect positive or negative rotation of the actuator drum 2 (Figure 2), when the clutch 23 (Figure 8) is thus engaged. As described more completely in the aforementioned Friden Patent Number 2,142,892, the pin 117 is slotted at one end to embrace the edge of a pivotally mounted reverse cam 119 whereby said pin may be slid longitudinally in the framing of the machine. Secured to said pin is an arm 118, which is secured to a collar 118B (Figure 16) operatively connected to a laterally slidable shaft 118A. Said shaft is adapted to selectively connect the driven side of clutch 23 to either gears 94 or 95 so that a drive is effected either through gears 94, 97, 98 to the actuators 2, or through gears 95, 96, 97 and 98 to drive the actuators reversely. A spring 122 (Figure 8) normally maintains bellcrank 121, link 120, and reverse cam 119 in the position shown where the pin 117 is held in its extreme position toward the left of the machine, so that upon engagement of clutch 23 the actuator is normally driven in a positive direction. If, however, it is desired to effect negative actuation, the operator depresses the minus key 29 (Figure 8), which is provided with a stud 124 on the stem of said key adapted to engage the top of the horizontal arm of bellcrank 121 and rock the same counter-clockwise about its pivot 123. This rocking movement pushes link 120 to the right (Figure 8) and rocks reverse cam 119 counter-clockwise to where the surface 119B slides pin 117 toward the right of the machine, thereby effecting a drive through gear 95 (Figures 8 and 16) to drive the actuator 2 reversely.

*Multiplier selection mechanism*

One means for introducing the multiplier values into the machine comprises a row of ten multiplier keys 40 (Figures 1 and 2), ranging in value from zero to nine. Said keys are slidably mounted on a supporting plate 41, by means of slots 42 formed in each key stem and studs 43 secured to said plate. Each key is held in raised position by a spring 44 tensioned between a lateral extension on the end of the key stem and one of the upper stationary studs 43.

The keys 40 are spaced equal distances apart and are identical in construction, except for the increased length of the keys due to the inclination of the cover plate. A pin 46 (Figure 2) is provided on each stem which is adapted to cooperate with notches 47 of a bar 48 slidable over the stationary studs 48C. The distance between each notch is slightly less than the distance between the keys 40, so that upon downward movement of said key the pin 46 engages the diverging side of one of the notches 47 and imparts a different longitudinal movement to the bar 48 for each key depressed.

The slide 48 (Figure 2) is provided with a stud 48B which is embraced by the bifurcated end of a rocking lever 49 keyed to a shaft 51. Also keyed to said shaft is a lever 52 (Figure 3) which is pivotally connected at its upper end to the left end of a stepped plate 53 which is held against a supporting pin 53A by a torsion spring 53B. The stepped plate 53 is provided with ten steps, one position for each key 40. The arrangement is such that, when the slide 48 is positioned by the depression of a multiplier key 40, the stepped plate 53 is moved to the right, over its supporting stud 53A into a position in which it serves as an interponent between the presently described power driven selection means and the multiplier control unit. Arranged adjacent the stepped plate 53 is a lever 54 (Figure 3) which is fulcrumed at 54A and has on its free end a lateral extension 54B adapted to be driven upwardly by a cam 56 when multiplier set up clutch 57 is engaged.

Means are provided for engaging the multiplier set up clutch 57 upon the depression of a multiplier key 40. Slide 58 (Figure 2) is mounted on plate 41 by means of slots formed therein engaging studs 59A on said plate, said slide being held in its forward position by a spring 58A tensioned between the forward stud 59A and a pin 58D on the slide 58. Slide 58 is provided with a plurality of upward extensions 58B having inclined faces complementary to the inclined faces on the ends of the key stems, and adapted to be engaged thereby. Roller 58C on said slide underlies an arm 59 secured to a sleeve 61. Secured to the other end of said sleeve is an arm 62 (Figure 3) and to said arm is pivotally secured a link 63 which is notched at its free end to engage a pin 64A on the clutch release bellcrank 64. The arrangement is such that upon depression of a multiplier key, the slide 58 is moved rearwardly and through roller 58C rocks arm 59, sleeve 61 and arm 62 in a clockwise direction whereby link 63, in moving rearwardly, rocks the clutch release bellcrank 64 in a clockwise direction against the tension of spring 64B to clutch engaging position.

Means are provided for limiting the engagement of the multiplier set up clutch to a single cycle. A pin 57A on the housing of the clutch 57 is adapted upon rotation thereof to contact the lateral extension 63A on the nose of link 63, rocking the same out of engagement with pin 64A on the clutch release bellcrank 64, thereby permitting the spring 64B to become operative to rock the nose of the bellcrank into engagement with the clutch housing so that said nose will engage the notch in the clutch housing at the end of the first rotation thereof to disengage the clutch.

The clutch 57, through the cam 56 operated thereby, controls a plurality of machine functions. The first of these is to transmit the values set into the machine by key 40, to the multiplier control unit. Another is to start the main clutch when the multiplier ranges from 1 to 9, or to start the shift clutch if the 0 key 40 is depressed. The method of entering the value into the multiplier control unit will be described first, and the other functions will be described under the sections relating to the main clutch and the shift clutch operations respectively.

A lever 66 (Figure 3) pivoted at 66A is equipped with a roller 66B which overlies the upper edge of the stepped plate 53. Pivotally secured to the right end of lever 66 is a link 67 which extends upwardly and connects the lever 66 with a lever 68 keyed to shaft 69. On the left end of shaft 69 is keyed a lever 68A and a shaft 71 rigidly connects the upper end of levers 68 and 68A so that shafts 69, 71, and levers 68 and 68A form a rigid assembly which is connected to the rocking lever 66 so as to participate in any movement imparted thereto.

The clutch 57 operates to transfer the multiplier values set into the machine to the multiplier control unit through the above mentioned linkage assembly. As previously described, stepped plate 53 is moved rearwardly, in proportion to the multiplier digit set into the machine, to position the corresponding step formed thereon over the lateral extension 54B (Figure 3). Upon rotation of the selection clutch and the cam 56, lever 54 is rocked upwardly and lateral extension 54B thereon contacts stepped plate 53 rocking the same upwardly whereby lever 66, link 67, and the shafts 69, 71, and levers 68 and 68A all rock in a clockwise direction against the torque of spring 67A in proportion to the number set by the multiplier key.

Setting member 76, slidably mounted on the shaft 71 (Figures 3, 4, 5, and 6), is capable of setting a segment 77 freely mounted on shaft 69, one of these segments being provided in each order and urged counter-clockwise about said shaft by torsion spring 77B. Each segment 77 is in constant mesh with the dial gear 78 of its associated multiplier control dial so that displacement of the segment by the slidable setting member produces a similar displacement of the corresponding dial through the gear 78. Each segment is equipped with a lateral projection 77A which is adapted to be engaged by a finger 76A on the setting member 76. Finger 76A includes a flat portion, normally lying against and laterally overlapping the outer portion of projection 77A, and an ear, formed immediately in front of said projection, so that, on downward movement of the setting member, segment 77 is positively carried with the same. Thus each segment can be separately rotated a number of increments corresponding to the value of a respective multiplier digit with the result that the multiplier value is set in the multiplier control register.

In this connection it should be noted that, as the stepped plate 53 has ten steps, the segment 77 may be set to ten different positions from its initial or neutral position, and correspondingly, the dials in the multiplier control unit have eleven positions. The initial or normal position of the mechanism will hereinafter be referred to as the blank position, the parts being shown in this position in Figure 3.

Means are provided for guiding the shiftable setting member in its rocking movement to insure correct operation. Setting member 76 is equipped with a roller 76B which normally lies just above plates 79 which are rigidly secured to transverse supporting plate 80 (Figures 3, 5, and 6). The vertical guiding plates 79 are spaced apart a distance equivalent to the spacing of the segments 77, and the roller 76B is of sufficient diameter to permit a minimum of side play to member 76 on its down stroke. It is to be noted that in the highest position of the setting member 76, that is, its neutral position, it is entirely above the top of the plate 79 so that it may be shifted laterally.

Means are provided for disengaging the shiftable setting member from the segment which has been set at the conclusion of the setting stroke thereof. Disposed inside of the levers 68 and 68A and directly adjacent thereto are a pair of levers 81 and 81A (Figure 4) which are slidably and rotatably mounted on the shaft 69. The upper ends of levers 81 and 81A support a transverse shaft 82 which projects through the tail end of the setting member 76. The lower end of levers 81 and 81A are provided with arcuate slots 83 and 83A, respectively, which are engaged by pins 84, 84A, on arms 86, 86A, respectively, said arms being secured to shaft 87 (Figure 4). One end of a link 88 is rigidly secured to shaft 87 and the other end thereof is pivotally secured to one end of a lever 89, the other end of which is supported by shaft 66A. Lever 89 is provided with a downward extension 89A which is adapted to be engaged by the lateral extension 54B on lever 54 near the end of the stroke of the latter, serving to rock said lever 89 against the tension of spring 89B. Cam 56 is so proportioned that it gives the arm 54 a slightly greater stroke than is necessary to move segment 77 to the desired position, and during this extra stroke, lateral extension 54B thereon engages lever 89 to release the shiftable setting member from the segment 77. Upward movement of lever 89 rocks arm 88, shaft 87, arms 86 and 86A in a counter-clockwise direction whereby pins 84 and 84A slide the levers 81 and 81A diagonally downward with respect to the shaft 69. Shaft 82, which projects through the tail of setting member 76, rotates the setting member about shaft 71 in a clockwise direction so that finger 76A formed thereon is disengaged from ear 77A on the segment 77. Suitable means are provided for retaining the rack 77 in set position as is fully described hereinafter. Due to the arcuate slots formed in the end of levers 81 and 81A, this operation can take place in any rocked position of setting member 76 and segment 77 whereby said setting member is free to return to its normal position under the influence of spring 67A (Figure 3). Spring 89B becomes effective at the end of the setting operation to restore the releasing means to inoperative position as shown in Figure 4.

The foregoing mechanism, while possibly not indispensable, is clearly desirable in a machine of this character. The lugs 77A are relied upon to hold the spring pressed member 76 against transverse movement, and hence 76 is spring-pressed against these lugs during clockwise setting movement of the segments 77, and would tend to restore these segments toward their blank positions when restoration of member 76 is effected, were it not for the disconnection effected by the mechanism of Figure 4. The dial pawls 106 are merely a yieldable and not a positive holding means, and segment spring 77B tends to restore 77 and dials 101 toward blank position. It is therefore desirable to completely disengage 76 from 77A at the end of the setting operation, so that the frictional engagement of 76 with 77A under pressure from spring 93 (Figure 6), will not cause 76, during its restoring movement, to displace 77 from set position.

Means are provided for controlling the lateral displacement of the shiftable setting member 76 from order to order in the multiplier control unit so that the values are entered therein successively from the higher to the lower orders. At the end of an operation, the shiftable setting member 76 is returned into position where it cooperates with the highest order segment 77, and, after a number is set in the higher order, it is shifted to the next lower order. Vertical plates 79 have been previously described as being adapted to guide the shiftable setting member 76 in its setting movement and return it to normal position. These plates also serve to prevent lateral displacement of the same during the setting operation. As the roller 76B approaches the top of the plate, extension 76C at the top of said member 76 engages a notch formed in the offset portion of a spring biased pawl 91 (Figures 3, 5, and 6). Pawl 91 is pivoted at 94A (Figure 6) to a downwardly extending arm 94 which is rigidly secured to a sliding member 112 described in detail hereinafter. This sliding member in turn carries a rearwardly projecting pin 111 which engages the elongated hole 92C in the upper portion of bellcrank 92. The latter is pivoted at 92A to an ear mounted on the base plate of the machine.

Bellcrank 92 is constantly urged toward the right of the machine, as viewed in Figure 1 (which is toward the left in the rear elevation shown in Figure 6), by a spring 93. Thus, whenever setting member 76 is raised to its highest position and engaged with the pawl 91, this mechanism has a tendency to shift said setting member to the next lower order. Before a set-up is made in a particular order, the setting member is held in such order by the engagement of finger 76A on the setting member with the extension 77A on the segment 77. When, however, the segment 77 is displaced by the setting operation and is moved from its blank position into the zero position, or farther, finger 76A withdraws from extension 77A by clockwise rotation of member 76 on shaft 71, leaving extension 77A at its lower position allowing setting member 76 to return to its initial position. The extension 77A is then out of the path of finger 76A and as soon as roller 76B rises above its adjacent plate 79, setting member 76 can be moved by bellcrank 92 and pawl 91 to the next lower order in which an extension 77A offers obstruction to further movement.

Means are provided for holding the escapement mechanism in operative relation with the setting member in the order in which a value is being set during said setting operation. Supporting plate 80 (Figures 5 and 6) has a series of notches 80B formed in the upper edge thereof so that as setting member 76 is lowered in starting a setting operation, pawl 91, under influence of spring 91A, moves downwardly, the offset portion thereof engaging the aligned notch in the plate 80 whereby pawl 91 and bellcrank 92 are held against movement until, at the end of the return stroke of setting member 76, pawl 91 is engaged thereby and rocked out of engagement with the notch in plate 80.

*Multiplier control unit*

The multiplier control unit can consist of as many orders as desired, but in the intsant machine there are eight orders. Each dial assembly comprises a dial 101 (Figure 13A) with the numerals from zero to nine delineated thereon and a blank space between the nine and zero, as previously mentioned. Rigidly secured to the dial 101 is a knurled disc 102 and the gear 78. This gear, meshes with the rack 77 to permit entry of the values therein. Within the dial 101, and secured thereto, is a detent wheel 103 adapted to be engaged by a spring pressed pawl 106 (Figure 5) during the introduction of a value. The pawl is disconnected from detent wheel 103 during a clearing operation, as will be more specifically described hereinafter.

The elements of each dial assembly are secured together as a unit and are freely rotatable on the transverse supporting shaft 104 (Figures 3, 5 and 13A). The knurled disc 102 extends through the casing of the machine whereby the operator can manually enter or correct a value in the dial, or return the dials to zero or blank position individually, if so desired. This may be done either while the machine is operating, or at the beginning of the operation, if such method of setting is preferable to the use of the multiplier keys.

Means are provided for clearing the multiplier control unit which can be accomplished either automatically or manually. Retaining pawls 106 are pivotally mounted on the transverse shaft 107 (Figure 5), the noses 106B thereof being offset to extend within each dial and cooperate with detent wheel 103 thereof to retain the dial and segment 77 in their adjusted position against the torque of spring 77B (Figure 3), which tends to return the same to their blank or inoperative position. Each pawl 106 is urged into engagement with the detent wheel 103 by a spring 106A tensioned between the tail of the pawl and a plate secured to the supporting frame. Cooperating with each pawl 106 is a pawl 108 pivotally mounted on the transverse shaft 109 and provided with an offset nose 108A which overlies the tail of pawl 106 and is adapted in one position thereof (shown in Figure 5) to rock the pawl 106 to disengaged position against the tension of spring 106A. Pawl 108 is provided intermediate its end with an upward extension 108B which is adapted to be positioned on one side or the other of the spring pressed ball 110 which maintains the pawl in either of its adjusted positions.

The conditioning of pawls 108 and 106 is controlled by the bellcrank 92 which serves to determine step by step movement of the shitable setting member. To accomplish this purpose the arm of bellcrank 92 is extended upwardly through the top cover, terminating in a handle to permit manual operation thereof. The upper arm of bellcrank 92 is slotted at 92C (Figure 6) to receive stud 111 secured to a slide 112 which is mounted for transverse movement in suitable guides 113 (Figures 5 and 6). Secured to said slide 112 are a pair of oppositely acting cam surfaces 114 and 116, which are adapted to engage the tails 108C of pawls 108 and rock the same to engage or disengage pawls 106 from detent wheel 103. As shown in Figures 5 and 6, cam surface 114 is effective upon movement of bellcrank 92 from a higher to a lower order to rock pawls 108 to permit engagement of pawls 106 with detent wheel 103 while cam surface 116 is effective, upon movement of said bellcrank from a lower to a higher order, to rock pawls 108 in a counter-clockwise direction to disengage pawls 106 from said detent wheels. The upper cam surface 114 is relatively positioned to the tail 108C of the pawl 108 which cooperates with the dial mechanism which is adapted to be set by the shiftable setting member 76, so that as the setting member moves from the higher to the lower order or to the left, as viewed in Figure 6, pawls 106 are permitted to successively engage the respective detent wheels 103 to hold the dials and control mechanism in set position against the torque of the springs 77B (Figure 3). Thus, while a dial is being set, the nose of pawl 106B rides over the teeth of detent wheel 103 and is adapted to retain the dial assembly in set position at the conclusion of the setting operation.

At the conclusion of the multiplying operation, the bellcrank 92 is returned to the position shown in Figure 6, either manually or by power operated means, in a manner to be described hereinafter. During return movement, the cam surface 116 becomes effective to rock the pawls 108 in a counter-clockwise direction, whereby the pawls 106 are disengaged from the dial assembly permitting the dials and segments 77 to return to their blank position under the influence of springs 77B. In this connection it should be explained that the power operated means moves bellcrank 92 to a sufficient extent to bring the cam surface 116 past pawl 108 in the highest order of the register so that all of the dials are cleared and thereafter bellcrank 92 moves to the left, as viewed in Figure 6, under the influence of spring 93 until the finger 76A on the setting member 76 engages the extension 77A on the segment 77 in the highest order in which a "blank" is registered.

Main clutch control

Clutch control mechanism affords two optional methods of starting the main clutch. In one of these methods, the main clutch is automatically engaged by the power selection mechanism immediately after the first multiplier digit is set into the multiplier control register; in the other of said methods, the machine is so controlled that all, or any number of digits of the multiplier may be set into the multiplier control register and thereafter one of the control keys is depressed to engage the main clutch.

Selectively operable automatic means are provided for engaging the main clutch upon operation of the multiplier set up mechanism. In describing said mechanism, it has been explained that stepped plate 53 (Figures 3 and 7) is rocked upwardly by the lateral extension 54B operated by the cam 56 on the clutch 57. This upward movement of stepped plate 53 is utilized to engage the main clutch. Pivoted to the frame of the machine at 132 is a lever 131 (Figure 7) which is equipped at its forward end with a lateral extension 131A, which is adapted to overlie stepped plate 53 when said plate is moved rearwardly to determine the setting of any value from 1 to 9 into the multiplier control register, thus the lever 131 is rocked by stepped plate 53 during its operative movement. The rearward end of lever 131 is equipped with a roller 131B which is adapted to contact, on downward movement thereof, a cam surface 133A of a pendular rocking lever 133 pivoted to the frame of the machine at 133B (Figures 6 and 7). The extreme right end of the lever 131 rests against the pivot 133B in which position it is maintained by a tension spring 134 secured to a downward extension of lever 131 and to a pin on lever 133. Lever 133 is provided at its lower end with a right angle projection 133C which is adapted to be engaged by a hook 136A on a link 136 which is connected at its forward end to a parallel linkage 137, 137A, 137B, the forward arm 137A of which is secured to the shaft 32 (Figure 7). Shaft 32 carries at its other end the control plate 31 (Figure 8) which, as previously described, is adapted on clockwise movement thereof to engage the clutch 23 in the manner previously described.

Settable means are provided for disabling the automatic starting means at the option of the operator so that the entire multiplier, or any portion thereof, can be set before the operation is started. This means comprises a manually settable lever 141 (Figures 1 and 7), one end of which extends through the top plate of the machine, said lever being pivoted at 142 and provided at its right end with a lateral extension 141A which is adapted, when said lever 141 is moved to the position marked "Hold" (Figure 1), to underlie a downward extension 136B on link 136 and hold said link raised so that the hook 136A thereon is above the lateral extension 133C on lever 133 and the movement of lever 133 is not effective to move link 136 rearwardly to engage the clutch. When lever 141 is moved to the position marked "Start" (Figure 1), the right end thereof moves downwardly so that the hook 136A engages the lateral extension 133C and the automatic means for engaging the main clutch is enabled. A compression spring 141B (Figure 7) maintains the lever 141 in either position to which it is adjusted.

Means are provided for latching the clutch engaging means in operative position throughout the number of cycles of operation thereof determined by the depressed multiplier key. Said means comprises a latching bellcrank 143 (Figures 6 and 7) pivoted at 143A and constantly urged in a counter-clockwise direction by torsion spring 143B. The short horizontal arm of said bellcrank is provided with a lateral extension 143C which underlies and is urged against the lower end of lever 133 as shown in Figure 7. When lever 133 is moved rearwardly to cause engagement of the clutch, by moving the clutch engaging means to operative position, spring 143B rocks the lateral extension 143C to a position in front of the reduced extremity of the lever 133 to hold the same and the clutch engaging means in operative position.

Means are provided to lock the reverse mechanism in its set position throughout an entire multiplication, so that if the machine should stop, as when it catches up with the operator during the setting of the multiplier digits, it will operate in the same direction when the machine restarts. If the machine, for instance, were started operating negatively, by the depression of the minus key 29 (Figure 8), the depression of said key would by means of the stud 124 rock bellcrank 121 counter-clockwise. A roller 29A mounted on said bellcrank is adapted to engage the plate 31 to start the main clutch as described hereinbefore. During the downward movement of roller 29A, as it enters the slot 31B, the tip 31A on lever 31 moves to a position overlying the roller 29A. Since plate 31 (as described above) is locked by the effect of the engagement of ear 133C and shoulder 136A (Figure 7) the tip 31A thus retains roller 29A (Figure 8), bellcrank 121, and the reverse mechanism controlled thereby in a negative position. If the operation were started in a positive direction, as by depression of the plus key 28, the roller 28A would rock plate 31 to a position where tip 31A underlies roller 29A to lock the reverse mechanism in a positive position until shoulder 136A is disengaged from ear 133C during the reconditioning operation.

Means are provided to release the reverse mechanism and the main clutch engaging linkage at the conclusion of the multiplying operation. The long upright arm of bellcrank 143, upon movement of said bellcrank to latching position, is moved into the path of a cam 306 driven by a return clutch 291 which, as will be described hereinafter, is engaged at the end of the operation for the purpose of reconditioning the mechanism for another multiplying operation. Upon rotation of cam 306, bellcrank 143 is rocked to delatching position allowing the clutch engaging means to move to clutch disengaging position under the influence of spring 27 (Figure 8). It should be noted that the above described latching means is operative irrespective of the position of the control lever 141. However, upon depression of the plus or minus key to initiate the multiplying operation, link 136 is moved rearwardly and the downward extension 136B is provided with an inclined forward edge so that hook 136A thereon falls behind the lateral extension 133C on the lever 133 which is already latched in displaced position by the latching bellcrank 143. Thus, in either position of the control lever 141, the latching means above described is operative to maintain the main clutch engaging means in operative position throughout the multiplying operation.

*Automatic control mechanism*

The automatic control mechanism disclosed herein is designed to meet a number of different operating conditions which are encountered in this type of mechanism. These can include the following: If the machine is started when the accumulator carriage is in such a position that the controlling mechanism is enabled in a higher order than that in which a digit has been set, the shift clutch must be engaged until the carriage enters the order in which the first or highest order multiplier digit is set. If the carriage is in this latter position when the operation is initiated, the main clutch must be engaged for a number of revolutions corresponding to the value of the multiplier digit in that order. At the conclusion of this multiplication, the main clutch must be disengaged and the shift clutch initiated to shift to the next order. If a multiplier digit greater than zero has been set in this order, the main clutch must be started again to count out the multiplications indicated by that multiplier digit. However, if the next lower order is at zero, the restart of the main clutch is disabled and the shift clutch maintained in engagement to continue shifting until an order is reached in which a multiplier digit greater than zero has been set.

The segment 77 (Figure 3) carries an arcuate member 72 (Figure 7) mounted to revolve therewith. Said member being pivoted to segment 77 at its upper end by pin 72A (Figures 3 and 7), is resiliently maintained in alignment therewith by compression spring 73 (Figure 7). The spring is held between an offset ear on member 72 and an offset ear on segment 77 so that member 72 is moved to a position representative of the value standing on the multiplier control register dial 101. In Figure 7, arcuate member 72 is shown in the position it occupies when the dial is in its blank position. Cooperating with each member 72 is a mutilated ratchet wheel 151 (Figure 7) which is aligned therewith and loosely mounted on the shaft 69. Ratchet wheel 151 is provided with two series of teeth on opposite sides thereof, one of which series is utilized in advancing said wheel during actuation when that order of the multiplier is the controlling order. A suitable coil spring 151A holds an extension 151B on the ratchet wheel against a suitable transverse stop member 152.

Associated with each ratchet wheel 151 and disposed underneath it in cooperative relation with the lower set of teeth formed thereon, is an actuating pawl 153 which is normally held out of operative relation with the associated ratchet wheel by means to be later described herein and which is capable of actuating said wheel in a step by step movement in clockwise direction. All the actuating pawls 153 are pivoted on a transverse shaft 154 which is supported by the legs of the U-member 156. This member is mounted for rocking movement on pins 159, while its legs are held in contact with the flat or eccentric portion of a transverse shaft 158 (Figure 7) by spring 157. Shaft 158 is rotated once for each rotation of the actuator, being driven in time with the same by a suitable drive train, as shown in Figure 16, and hence all of the actuating pawls 153 receive one reciprocation for each rotation of the actuator.

Means are provided for holding all of the actuating pawls out of operative relation with the associated ratchet wheels except in that order which controls the ordinal multiplication. A compression spring 153A urges pawl 153 in a clockwise direction and into active position. Associated with each pawl 153 is a bellcrank 166 pivoted on transverse shaft 166C, said lever being provided with a pin 166B which overlies the tail of actuating pawl 153 and normally holds the same in inactive position through the action of a torsion spring 166A which is stronger than the compression spring 153A (Figures 7 and 14).

Means are provided for enabling the actuating pawl in the order in which an operation is determined under control of the multiplier digit set therein. The upper arms of bellcranks 166 are in alignment with the outside diameter of a shaft 167 (Figures 7 and 14), which is secured at its left end to the support 17 (Figure 14), which carries the ordinal indicator 18 for the revolutions counter and the revolutions counter actuator. Shaft 167 is provided near its right hand end with a cam 168 which is positioned opposite the respective bellcrank 166 which corresponds to the particular order in which the carriage is set for operation, being adapted to rock the same in a counter-clockwise direction as viewed in Figure 7, to permit the associated actuating pawl 153 to move to operative position. It will be recalled that the revolutions counter actuator is shifted in a direction opposite to the movement of the accumulator carriage so that when the carriage is in its extreme right hand position, cam 168 is positioned opposite the highest order pawl 166 and, as the carriage is shifted to the left, shaft 167 and cam 168 are shifted to the right, to successively enable the corresponding actuating pawl 153, so that when the actuator is rotating, shaft 158 oscillates the enabled pawl 153 to successively advance the associated ratchet wheel 151 in a clockwise direction.

Means are provided for holding the ratchet wheels in their advanced position after each successive movement imparted thereto by the actuating pawl. Associated with the upper series of teeth on each ratchet wheel 151 is a retaining pawl 171 pivoted on transverse shaft 172 and urged into engagement with the ratchet wheel 151 by a tension spring 173. Pawls 171 are disengaged from ratchet wheels 151 at the end of each multiplying operation by reciprocation of a bail 174 (Figure 7) which extends the full length of the multiplier control register and underlies extensions 171A on said pawls. Bail 174 is pivotally mounted on shaft 109 and is provided with a forward extension to which is pivoted a link 175, the lower end of which is pivotally secured to a bellcrank 296 and which is rocked in a clockwise direction at the end of each multiplying operation in a manner hereinafter set forth.

From the foregoing description it is seen that each ratchet wheel 151 is advanced one step of movement for each cycle of the actuator with the carriage in the position corresponding to the ordinal position of the multiplier associated with the ratchet wheel and this successive advance of the ratchet wheel 151 is utilized to determine the correct number of actuations in each order.

Means are provided for disengaging the main clutch upon the completion of a number of actuations thereof corresponding to the value of the multiplier digit set in the controlling order. Arcuate member 72 (Figure 7) is provided with a cam 72B which is adapted to cooperate with the extension 151B on the associated ratchet wheel, whereby said member 72 is rocked about its pivot 72A out of its normal position and against the pressure of spring 73. When ratchet wheel 151 and arcuate member 72 are in their normal position as shown in Figure 7, member 72 is maintained in its rocked position and it is still maintained therein if moved from its blank position to its zero position by the selection mechanism. When a number of 1 or greater is set up in order on the multiplier register, member 72 is revolved upwardly about shaft 69 until the cam surface 72B no longer contacts the extension 151B on ratchet wheel 151 and member 72 is rocked inwardly into its normal position. In the controlling order, pawl 153 is enabled and the ratchet wheel 151 is moved clockwise step by step until extension 151B thereon encounters the cam surface 72B rocking the arcuate member 72 about its pivot 72A.

Means are provided for sensing this movement to determine a disengagement of the main clutch at the end of the cycle. The sensing means comprises an arm 176 pivoted on the shaft 167 and shiftable therewith (Figures 7, 14, and 15). When cam 168 enables an actuating pawl 153, arm 176 lies immediately behind arcuate member 72 in that order, whereby movement of member 72 by extension 151B causes clockwise movement of lever 176 about shaft 167. During such clockwise movement, lever 176 engages and rocks a bail 177 which extends across the entire multiplier control unit. Downward movement of the bail 177 presses down a three-arm bellcrank 179, the upper arm of which is capable of being disposed underneath the bail (Figure 8), said bellcrank being pivoted at 181 to a second bellcrank 182 pivoted on shaft 178 (Figures 7 and 8). Clockwise movement of bellcrank 182, through lateral extension 182A on the lower arm thereof by engagement of the end of arms 183, rocks shaft 184 to which arm 183 is keyed. A second arm 186, secured to said shaft (Figure 8), is provided with a pin 186A which underlies the clutch control link 33 so that clockwise oscillation of said arm lifts said link from engagement with pin 34 on the clutch release bellcrank 24 permitting the same to be rocked counter-clockwise under the influence of spring 27 into position to disengage the clutch at the end of that cycle.

The above described means for disengaging the main clutch at the end of the number of actuations determined by the multiplier digit then in control is normally disabled during other operations, and is enabled automatically upon initiation of a multiplication operation. The three-arm bellcrank 179 (Figures 7 and 8) is normally in the position shown in Figure 7, in which the upper arm thereof is out of engagement with the overlying bail 177 so that any downward movement of said bail is rendered ineffective, insofar as the control mechanism is concerned. However, an operative connection is established between the two upon the first operation of the clutch 57 (Figure 7). The forward arm of bellcrank 179 is provided with a pin 179A which overlies the upper edge of a lever 191 pivoted on shaft 66A. The free end of said lever is T-shaped and the lower edge of said end overlies lateral extension 54B. Upon initial operation of clutch 57, cam 56 rocks arm 54 and extension 54B upwardly, said extension rocking lever 191 to move lever 179 about its pivot 181 in a clockwise direction, whereby the upper arm of the three-arm bellcrank 179 is in operative position within the longitudinal groove in bail 177, as illustrated in Figure 8. Lever 179 remains in operative position until the end of the operation when return clutch 291 is engaged and lug 307 on cam 306 strikes the under side of the rearward arm of bellcrank 179 rocking the same in a counter-clockwise direction to disengaged position.

In lieu of the above described method of setting the multiplier values and initiating the operation of the machine, the entire multiplier value of a multiplication problem may be entered in the dials 101 by manipulating the knurled discs 102. Thereafter, the operation of the machine may be initiated by depressing a multiplier key of a value equal to or less than the first multiplier digit as set up on the dials; i. e., the digit of highest demnomination. This effects operation of the multiplier set-up clutch 57 in the manner described hereinbefore to cause correct functioning of the machine under control of the dials 101.

Automatic carriage shifting means are provided which are adapted, when an automatic multiplication has been started, to determine an automatic engagement of the shift clutch each time that the actuating clutch is disengaged unless the last order selected for operation has been reached or the machine has caught up with the operator and no set-up has been made in the order to which the control mechanism would next be shifted. The arrangement is also such that if the carriage is standing in an order corresponding to a multiplier dial position further to the left than that in which the set-up of the multiplier is started, the carriage will automatically start shifting as soon as the set-up is commenced and will shift into the column in which the set-up has been started.

The first of these controls for the shift clutch, which will be described, is that which is operated each time that the main clutch is disengaged during an ordinary multiplying operation. The shift clutch 201 (Figures 9, 10 and 16) is of the same type as the clutches heretofore referred to and the clutch described in the above mentioned Patent Number 1,643,710 to Friden. Attached to the clutch housing is a worm type cam 202 which, upon rotation of the clutch housing, reciprocates a link 203 laterally (Figure 10) to operate carriage shifting mechanism, the details of which are not important to an understanding of the present invention, and are not described herein, reference being had to the Friden Patent Number 1,986,888, dated January eighth, 1935, and Friden Patent Number 1,970,512, dated August fourteenth, 1934. The shift clutch release bellcrank 204 is pivoted at 206 and is urged into engagement with the clutch housing by a spring 204A (Figure 10). The tail 204B of clutch release bellcrank 204 underlies the end of a member 207 attached to members 208 and 209 by pin and slot connections so that said member 207 is movable with respect to both of the members upon which it is mounted. Member 207 is provided at its upper end with a stud 207A which engages an elbow slot 208A (Figure 11) in member 208, while a diagonal slot 207B formed in the lower end of member 207 engages a pin 209A on member 209. Spring 207C, tensioned between a lug on member 207 and a stud on member 208, tends to pull the member 207 so that pin 207A thereon is engaged in the right end of the slot 208A to move the member 207 to the position shown in Figure 11. In this position, it is in operative relation with respect to the clutch release bellcrank 204 so that downward movement thereof serves to engage shift clutch 201.

Member 207 remains in normal position as shown in Figure 11 unless moved to inoperative position in either of two manners, one of which consists in moving member 207 to the position shown in Figure 10 wherein the pin 207A is in the upper left end of slot 208A and the other of which consists in rocking said member so that the lower end of 207 does not lie above the lateral extension 204B. These two methods of disabling the shift clutch engaging means will be more specifically described hereinafter and for the purposes of the present description it will be understood that member 207 occupies the position shown in Figure 11 in which position downward movement thereof serves to engage the shift clutch.

Power operated means are provided for operating the shift clutch engaging means at the conclusion of the predetermined number of actuations in each order. Members 208 and 207 are adapted to be reciprocated, at the time the main clutch is disengaged, by a link 211 (Figures 5 and 11) which is pivotally secured at 212 to an arm 213. This arm is pivoted at 214 and is provided with a roller 213A which is held in engagement with a cam 216 by a spring 213B tensioned between the right end of lever 213 and the supporting plate 80 (Figures 5 and 11). The cam 216 is driven from the main clutch and the cam rise thereon is so positioned that lever 213 is depressed when the clutch is in full cycle position so that the downward movement of lever 213 and link 211 occurs just at the end of each rotation of the main clutch. Link 211 is maintained to the right of ear 208C on member 208, as shown in Figure 11, during every reciprocation thereof except that occurring at the end of the last actuation in each order so that shift clutch 201 is not engaged until such time.

Means are provided whereby the operating means for the shift clutch engaging mechanism is enabled during the last rotation of the actuating clutch in each order. Link 211 is provided with a pin 211B (Figure 11) which is engaged by a slot formed in the enlarged end of a link 217, the other end of which is pivotally secured to the lower arm of bellcrank 182. A spring 217A tensioned between a stud on link 217 and pin 211B holds said pin within the slot in the end of member 217 and, as shown in Figure 11, member 217 holds arm 211 to the right so that notch 211A formed in the end of arm 211 is normally positioned to the right of the lateral ear 208C on member 208.

It will be recalled that at the beginning of the last cycle of rotation of the main clutch, bail 177 is rocked downwardly, thereby rocking bellcrank 179 downwardly and bellcrank 182 in a clockwise direction. At this time roller 213A is engaged with the lower part of the periphery of cam 216 and lever 213, link 211 and link 217 are in their raised position so that clockwise movement of bellcrank 182 serves to position the notch 211A over the lateral extension 208C whereby the depression of lever 213 and arm 211 by the rise on cam 216 serves to rock member 208 and member 207 downwardly. The clutch release bellcrank 204 is thus rocked to clutch engaging position and a shifting operation is initiated.

The above described operation of the shift clutch control mechanism occurs at the end of the cycles of rotation of the main actuating clutch determined by the multiplier value set in any order, unless a value has not been set in the next lower order or unless the lowest order multiplication determined has been performed. In these two latter cases the operating means for the shift clutch engaging mechanism is disabled as described hereinafter.

After a shifting operation, three different conditions may be obtained in the set-up of the next lower controlling order which require different operating responses of the multiplying mechanism. The first condition is that, if a number greater than zero is set in the next lower order, the main clutch must be restarted to perform this ordinal multiplication. The second condition occurs when a zero has been set in the next lower order in which case the shift clutch must be kept engaged to shift through another order. The third condition which may obtain in this set-up is that an order may not include any set-up and the multiplier control dial in that order is in its blank condition. In this event the machine must be stopped until a number has been set therein. Upon this event, the machine will start and perform the corresponding operation or operations indicated by the newly set number, whether it be zero or greater than zero, as will presently appear.

Considering first the condition in which a number greater than zero is set in the next lower order, since this is the most common condition, means are provided for restarting the main clutch after a shifting operation to perform the required ordinal multiplication. Secured to the housing of the shift clutch 201 (Figure 9) is a cam 231 which is adapted to rock arm 232 engaged therewith in a counter-clockwise direction near the end of each cycle of operation of said shift clutch. Arm 232 is loosely mounted on shaft 184 and is held in contact with the periphery of cam 231 by a suitable compression spring 233. Rigid with arm 232 is a second arm 234 to the free end of which is pivoted a lever 236, provided at its upper end with a camming nose 236A and immediately below said end with a shoulder 236B. Lever 236 is urged in a counter-clockwise direction by the spring 237 so that the shoulder 236B formed thereon engages arm 183 (Figures 8 and 9) fast on shaft 184. Also fast on said shaft is an arm 185 which, as shown in Figure 8, underlies a pin 24A (Figure 8) on the main clutch release bellcrank 24. The arrangement is such that during the last part of the rotation of the shift clutch 201 (Figure 9), arm 232, arm 234 rigid therewith are rocked in a clockwise direction carrying lever 236 upward to rock arm 183, shaft 184, and arm 185 to move main clutch release bellcrank 24 (Figure 8) to clutch engaging position. The latch 143 being still in latching engagement with lever 133 (Figure 7), reengagement of pin 34 in the notch of link 33 latches dog 24 in clutch engaging position.

Means are provided for disabling the above described main clutch restarting mechanism whenever the next lower multiplier control dial is in its zero position. When this condition obtains, cam 72B on arcuate member 72 is engaged by the lug 151B so that it is held in its rocked position thereby holding arm 176 in position to depress bail 177, as shown in Figures 7 and 9. The supporting arm for bail 177 at one end thereof is provided with a rearward extension 177A (Figure 9). This is provided with a pin 177B adapted to contact the camming nose 236A of lever 236 and rock the same against the tension of spring 237 until notch 236B formed therein is disengaged from the nose of an arm 183, as illustrated in Figure 9. The result of the above conditioning of the mechanism is that the rocking of lever 232 and arm 234 by the cam 231 is inoperative to rock arm 183, shaft 184 and arm 185 to engage the main clutch so that when the next lower control dial is set at its zero position, the restarting mechanism for the main clutch is disabled.

Means are provided for disabling the above described restarting mechanism when the starting control lever 141 is in its "Hold" position, which determines that the multiplying operation is to be initiated by depressing the plus or minus bar. As shown in Figure 7, when said starting control lever 141 is positioned in its forward or "Hold" position, lateral extension 141A on the lower arm thereof holds link 136 in raised position. Link 136 is provided with a pin 136C which underlies the lower arm of lever 236 as shown in Figure 9, and is adapted, when said lever is in its "Hold" position, to rock lever 236 against the tension of spring 237 to remove the shoulder 236B from engagement with the arm 183 so that the restarting mechanism is thereby disabled and the linkage, reciprocated by the cam on the shifting clutch 201, is rendered inoperative to engage the actuating clutch. However, as soon as the operation is started, it will be recalled, link 136 is moved rearwardly until hook 136A formed thereon is engaged behind lateral extension 133C. This movement permits link 136 to move downwardly so that the pin 136C no longer holds the lever 236 rocked in its disabled position but permits the same to move back into engagement with the arm 183 whereby the restarting mechanism is enabled for subsequent operation during the solution of the problem set into the machine.

If, after the shifting operation, the control unit in the next lower order is set at zero, the carriage shift clutch must be maintained in engagement to effect another shifting operation. It will be recalled that the main clutch restart mechanism is disabled when this condition obtains and, the main actuating clutch being at rest, cam 216, as shown in Figure 11, serves to hold lever 213 and arm 211 in their lowered position. The next lower order being set at zero, arcuate arm 72 (Figure 7) in that order is in its rocked position so that when interponent 176 is moved into position in said order by the shifting movement of the carriage, bail 177 is again depressed, having been allowed to move upwardly during the time interponent 176 (Figures 7 and 14) was moving from the higher to the next lower order between adjacent arcuate arms 72. During such upward movement of gate 177, bellcrank 182 is returned to normal position as shown in Figure 11, arm 217 moves to the right and link 211 is moved off of lateral extension 208C on lever 208 whereby members 208 and 207 are restored to raised position by the tension of spring 209B (Figure 10). This permits the shift clutch release bellcrank 204 to again contact the shift clutch 201 in position to disengage the same at the end of the shifting operation. However, as interponent 176 engages the next lower arm 72, it is again rocked in a clockwise direction, again depressing bail 177 which, through bellcrank 179 (Figure 7), again rocks bellcrank 182 in a clockwise direction, moving link 217 to the left as viewed in Figure 11. Link 217 has been maintained in lowered position due to the engagement of the cam rise on cam 216 with roller 213A on lever 213 so that upon movement thereof to the left, cam surface 217B thereon, acting against lateral extension 208C, serves to depress members 208 and 207 to again rock the clutch release bellcrank 204 to clutch engaging position. From the foregoing it is seen that the shift clutch operates successively to shift the carriage and the shiftable control mechanisms through any zero orders of the multiplier.

The third condition which may obtain in the lower order to which the controlling mechanism is next to be shifted is that no value is set therein so that the dial and associated mechanism are in their blank position. In this event the above described mechanism operates in the same manner, however, auxiliary means are provided which disable the shift clutch control so that said mechanism is ineffective to engage the shift clutch.

Means are provided for sensing the next lower order than that in which the machine is working to determine whether or not a blank setting obtains therein. Rotatably mounted on shaft 167 (Figures 10, 14 and 15) near the right hand end thereof is an arm 251 which is provided with a bent ear 252 which extends to the right thereof, as viewed in Figure 15, and is adapted to sense whether or not the next lower dial is in its blank position. As shown in Figure 10, the knurled disc 102 is provided with an ear 102A which, when the dial is in its blank position, is adapted to engage the ear 252. When the inclined surface of ear 252 engages the extension 102A, arm 251 is rocked in a clockwise direction, the lower end thereof serving to depress a ball 253 (Figure 10) which extends across the multiplier control register and is supported by a shaft 178. The supporting arm on one end of ball 253 is in the form of a bellcrank 256, the lower arm of which is pivotally connected to one end of a link 257, whose other end is secured to the stud 207A on member 207. Clockwise movement of bellcrank 256 moves link 257 to the left, as viewed in Figure 10, and thereby moves member 207 to inoperative position. In this position, stud 207A is in the upper left end of the elbow slot 208A and the lower end of member 207 is raised a sufficient distance so that, upon depression of members 208 and 207 at the end of the ensuing operation, member 207 is ineffective to rock bellcrank 204 to engage the shift clutch.

Thus it is seen that when the carriage reaches a position in which the next lower order has a blank setting, the machine is stopped at the end of the operation then in progress and the shift clutch engaging means is disabled. Thus, when the machine completes the work in the last order in which a setting is made, it will not shift until the set-up is made in the next lower order. However, when a set-up is made in the next lower order, ball 253 is permitted to rise and link 257 to move back to the right, whereby member 207 is lowered to engage the shift clutch, such movement taking place under the influence of spring 207C.

In this connection it should be noted that the arrangement is such that if the carriage is standing in a higher order than that in which the set-up of the multiplier is started, the carriage will automatically start shifting as soon as the set-up is commenced and will shift into the column in which the set-up has been started. This is due to the fact that all orders to the left of those into which it is desired to set multiplier figures are moved to their zero position in a manner fully described hereinafter under the heading of "Left tabulator stop," so that ball 177 (Figure 7) is maintained in depressed position so long as interponent 176 is opposite an order in which arcuate member 72 is standing in its zero position. Upon initiating the setting operation in the desired order, the arm 54 (Figure 3) is rocked upwardly and lateral extension 54B thereon (Figure 7) contacts the underside of the nose formed on lever 191, rocking it upwardly to rock bellcrank 179 so that its upper arm is positioned underneath the gate 177. In so doing (a zero having been set in the order in which 176 stands) bellcrank 179 is rocked downwardly and bellcrank 182 is rocked in a clockwise direction thereby pulling link 217 to the left to start the shift clutch in the manner described above, i. e., through the medium of cam surface 217B, members 207 and 208. As all of these dials are in their zero position, having been moved from the blank position by the left tabulator stop, member 207 is maintained in its operative position as link 257 and bail 253 are in their normal inoperative position. Such shifting continues until the carriage reaches the position corresponding to the highest order multiplier control dial in which a value is set.

When the carriage enters the position corresponding to the highest order control dial in which a value is set, and if the starting control lever 141 is in its "start" position, the restart mechanism is in operative position and operates to start the main actuating clutch. However, if said starting control lever 141 is in its "hold" position, link 136 occupies the position shown in Figures 7 and 9 in which pin 136C thereon rocks bellcrank 236 to disable the restart mechanism so that the machine stops until the operator depresses the plus or minus key.

*Left tabulator stop*

It is desirable in multiplying mechanisms of this type to provide means, whereby the highest order multiplier digit is automatically entered in any selected multiplier register dial and to automatically determine initiation of machine operation in the selected order as well. The means provided for this purpose is herein termed the "Left tabulator stop," and comprises a handle 271 (Figures 1, 5, and 15), extending through a slot in the top cover of the machine, which can be manually set in any position from the highest order to the right. The handle 271 is riveted to a camming slide 272 (Figures 5 and 15A), the operative portion of which is bent at right angles to the part to which the handle 271 is fastened. The downward extension of said slide is provided at its right end with a camming surface 272A (Figure 15) which, when said slide is in its extreme left hand position, lies immediately to the left of ear 102A on knurled disc 102 associated with highest order multiplier control dial assembly. Upon movement of said tabulator stop to the right, as viewed in Figure 15, the camming surface 272A becomes effective to rotate the knurled disc and the register wheel attached thereto in a counter-clockwise direction from the blank position to the zero position. The slide 272 passes through and is guided in a suitable opening in intermediate frame 5 and is also guided by support 17 for ordinal indicator 18 (Figures 2, and 14), which engages a slot formed in said slide. The result of the movement of slide 272 to the right, therefore, is to move all of the register dials which are encountered thereby from the blank to their zero position. It will be recalled from the description of the setting member 76, that said member is pulled to the left (Figure 6) by tension spring 93 engaging the upper arm of bellcrank 92, and setting member 76 moves to the left until the finger 76A thereon encounters lug 77A on the segment 77 which is standing in its blank position. Therefore, as slide 272 moves to the right, the setting member 76 follows until it reaches the first order below those engaged by the slide 272.

*Right tabulator stop*

The right tabulator stop serves to determine the order wherein the multiplication terminates and as a means for automatically initiating the operation of the automatic means which reconditions the control mechanism for a subsequent multiplying operation. A manually settable member 276, arranged to the right of the left tabulator stop 271, extends through the same slot in the casing. Handle 276 is riveted to a supporting member 277 which is provided with a pair of lugs engaging in a transverse slot in supporting bail 278 (Figures 5 and 15), so that handle 276 and member 277 comprising the right tabulator stop are displaceable to any desired ordinal position. The inner portion of said stop is provided with a beveled nose 277A which is in the path of cam 168 on shaft 167 and is adapted to be contacted thereby as said cam is shifted into the ordinal position in which the right tabulator stop is positioned. The construction and mounting of said stop is such that any movement imparted thereto by the engagement of the cam 168 with beveled nose 277A formed on the inner end of said stop is imparted to the bail 278 which is pivotally mounted on studs 279 secured to the right side plate and the intermediate supporting frame 5. At its right end, bail 278 is provided with a downwardly extending arm 278A which is pivotally connected to link 281 (Figure 5), the rearward end of whch is forked to embrace pin 209C on member 209. It is to be noted that the rocking of bail 278 does not affect left tabulator stop 271 which is narrower than the transverse slot in bail 278 within which it may be positioned as clearly shown in Figure 15A.

The arrangement is such that when right tabulator stop 276 is set in the order in which it is desired to terminate the operation, cam 168 on shaft 167 when shifting into that order encounters nose 277A on the tabulator stop, rocking the stop and bail 278 in counter-clockwise direction as viewed in Figure 5, thereby causing movement of link 281 to the right. Such movement of link 281 to the right rocks member 209 in a clockwise direction against the tension of spring 209D (Figure 10), moving member 207 therewith. The lower end of member 207 then does not overlie the lateral extension 204B on shift clutch release bellcrank 204 so that, at the end of an operation, when members 208, 207, and 209 are rocked downwardly, the shift clutch is not engaged. This movement of member 209 also renders the same operative with respect to the automatic reconditioning means, so that such downward movement is effective to enable said means in an manner to be immediately described.

*Automatic reconditioning means*

The automatic reconditioning means performs several functions. It returns the shiftable setting member to its extreme left hand position in readiness to set up another multiplier; it zeroizes the multiplier control unit so that another multiplier can be set therein, and it disables the automatic control mechanism so that use of the machine in performing other problems not involving operation of the multiplying mechanism has no effect thereon.

The operating means for reconditioning mechanism comprises the return clutch 291 (Figures 5, 12, and 16) which is of the same construction as the other clutches described herein, being connected to the motor by suitable gearing. The control means for clutch 291 comprises a clutch dog 292 (Figures 5 and 6) pivotally mounted on shaft 293 and provided with a nose adapted to engage a notch in the periphery of the clutch housing to disengage the clutch and position the same in full cycle position under the influence of spring 292E tensioned between arm 292C of said bellcrank and a pin on the base plate. One means for controlling bellcrank 292 comprises upwardly extending arm 292A (Figure 12), the function of which will be described hereinafter under the heading "Repeat mechanism." Bellcrank 292 is also provided with a short horizontal arm 292B provided with a lateral extension which is adapted to engage in a notch in a member 294 pivoted to the forward arm of a bellcrank 296 pivotally mounted on shaft 293 (Figures 5 and 6). Member 294 serves as an interponent between bellcrank 292 and bellcrank 296, the lateral extension on arm 292B being held in engagement with the notch 294A in interponent 294 by a suitable tension spring 294B secured to the upwardly extending arm of interponent 294 and arm 292A of bellcrank 292. The rearward arm of bellcrank 296 is held in engagement with a lug 292D on bellcrank 292 by a tension spring 296A secured to the forward arm of bellcrank 296 and a downwardly extending arm 292C of bellcrank 292.

The rearward arm of bellcrank 296 is provided with a lateral extension 296B which is adapted to be engaged by member 209 when said member is rocked to its left hand position in a manner heretofore described. Member 209 normally occupies the position illustrated in Figures 5 and 12, but is adapted to be rocked in a clockwise direction by link 281 to overlie lateral extension 296B so that downward movement of members 207, 208, and 209, at the end of the operation, is operative to rock bellcrank 296 in a clockwise direction. This movement of bellcrank 296 serves, through interponent 294, to rock the bellcrank 292 in a clockwise direction to engage the return clutch 291.

Means are provided for restoring the actuating clutch control means to inoperative position at the end of a multiplying operation. Bellcrank 296 is provided on the forward arm thereof with a pin 296C (Figure 12) which underlies extension 136E on link 136 so that, upon clockwise movement of bellcrank 296 at the end of a multiplying operation, link 136 is raised with the result that hook 136A thereon is also raised out of engagement with lateral extension 133C on arm 133. From the foregoing description it is seen that the actuating clutch control mechanism is returned to inoperative position at the end of an operation irrespective of the operation of the return clutch.

Means are controlled by the return clutch, for restoring the shiftable setting member to its highest order position, thereby conditioning the mechanism for setting another multiplier into the machine. A cam 301 (Figures 5 and 6) secured to the housing of return clutch 291, upon rotation of said clutch, rocks a bellcrank 302, pivoted at 303, in a counterclockwise direction against the tension of torsion spring 302A. As shown in Figures 5 and 6, the lower arm of bellcrank 302 underlies short arm 92B of bellcrank 92 so that counter-clockwise rocking of bellcrank 302 produces a clockwise movement of bellcrank 92 whereby the shiftable setting member 76 carried thereby is returned to the right to the position shown in Figure 6, such movement being sufficient to carry it beyond the highest order segment 77. When the return clutch completes its rotation, the upper arm of bellcrank 302 falls off the rise of cam 301 thereby releasing bellcrank 92 so that it can return to the left, as viewed in Figure 6, under the influence of spring 93 until the finger 76A on the shiftable setting member 76 engages lug 77A on the highest order segment 77 which is standing in its blank position. The return movement of bellcrank 92, to the highest order or normal position, serves to return all the multiplier control unit dials to the right of the left tabulator stop 271 to their blank position and those to the left thereof to zero position in the manner hereinbefore set forth in describing the clearing mechanism for said dials. This operation, it will be recalled from the specific description hereinbefore given, involves the release of detents 106 through levers 108 which, during the return of bell crank 92, are rocked by cam 116 carried on the member 112 actuated by said bell crank.

Means are provided for automatically disabling the automatic control mechanism during operation of the return clutch. Cam 306 (Figure 12) is provided integral with a collar secured to cam 301 (Figure 5) and the housing of the return clutch 291. Mounted on cam 306 is a lug 307 adapted, on rotation of the return clutch, to engage the rearwardly extending arm of the three-arm bellcrank 179 (Figure 12) rocking said bellcrank in a counterclockwise direction whereby the upper arm thereof is moved from beneath the gate 177 whereby depression of said gate is inoperative with respect to the mechanism controlled thereby during a multiplying operation.

Means are provided for limiting operation of return clutch 291 to a single cycle. In the event that the last order of the multiplier is set to a zero registration, it will be recalled that the link 217 (Figure 11) in moving to the left, due to the depression of bail 177 rocking the bellcrank 182, serves to depress members 207, 208, and 209. As members 209 and 207 have been rocked so that member 207 no longer overlies the shift clutch bellcrank 204, member 209 is in position to operate the return clutch bell crank to engage the return clutch. During operation of the return clutch cam lug 307 rotating therewith moves the three-arm bellcrank 179 to inoperative position so that link 217 is free to return to the right, thereby releasing the pressure on members 207, 208, 209, permitting the same to return from their depressed position. This relieves the pressure on bell-crank 296 and the return clutch release bellcrank 292 which is permitted to contact the clutch housing to disengage the clutch at the end of the rotation then in progress.

In the event that the downward movement of members 207, 208, and 209 is caused by the cam 216 from the main clutch, auxiliary means are provided for limiting the return clutch to a single rotation. Bellcrank 311 (Figure 12) is pivoted on member 208 at 208B with its upper arm immediately to the left of a pin 211C on link 211 while the lower arm is immediately in front of a pin 136D on the rearward end of link 136. It will be recalled that at the end of rotation of the return clutch, cam 306 thereon (Figure 7) contacts the upper arm of bellcrank 143 rocking the same in a clockwise direction to release arm 133 therefrom to permit link 136 to return to the right to disengage the main actuating clutch. Upon this return movement of link 136, pin 136D thereon (Figure 12) contacts bellcrank 311 rocking the same in a clockwise direction whereby link 211 is rocked in a counter-clockwise direction to remove the notch 211A, formed in the lower end thereof, from engagement with the lug 208C on member 208. Members 207, 208, and 209 then rise to their upper position, releasing bellcrank 296 and bellcrank 292 so that return clutch 291 is disengaged at the end of the rotation then in progress.

Repeat mechanism

The repeat mechanism provided herein is adapted to facilitate problems in multiplication in which the same multiplier is used in a series of computations. The mechanism is controlled by a manually operable key which, upon depression thereof, disables the automatic reconditioning mechanism thereby retaining the set-up in the multiplier control dials and allowing the shiftable setting member to stay in its displaced position below the orders in which values have been set, said disabling means starting operation of the reconditioning means after the repeat key is returned to its inoperative position.

The repeat key 316 (Figure 12) extends through the cover plate immediately to the left of the multiplier control register as shown in Figure 1. This key is pivotally and slidably mounted by means of an elongated slot formed therein which engages a stud 317 secured to a bracket fastened to intermediate frame 5. The key is provided with a notch 316A which, upon depression of the key, engages the cover plate of the machine and holds the key in depressed position. A tension spring 318 (Figure 12) is secured to a stud on the intermediate frame and a pin 316B on an end of the stem of the repeat key 316. This pin 316B overlies the upper arm of a bellcrank 319 pivoted on shaft 69, the lower arm of said bellcrank forming one parallel link of a parallel linkage 320–321. A strong spring 322 secured to shaft 69 at one end and to the pivot point of link 320 and arm 321 at the other tends to hold the parallel linkage in the position shown in Figure 12. Rigidly secured to arm 321 for movement therewith on shaft 178 is an arm 323 which is provided with studs 323A and 323B near the lower end thereof. Stud 323A lies in front of yieldable nose 324 pivoted on the upper arm 292A of bellcrank 292, said nose being adapted to yield upon clockwise movement of arm 323 to permit stud 323A to be positioned on the left side thereof. Stud 323B lies immediately to the right of the upper extension on interponent 294 so that clockwise movement of arm 323 disengages interponent 294 from arm 292B of bellcrank 292.

From the above description it is seen that the repeat key mechanism is so arranged that, upon depression thereof, pin 323A is positioned to the left of the yieldable nose 324 while pin 323B becomes operative to move interponent 294 to disengaged position thereby breaking the connection between bellcrank 296 and bellcrank 292 whereby the mechanism for engaging the return clutch at the end of the operation is disabled and only the clearing mechanism for ratchet wheels 151 is operated.

Means are provided to restore the ratchet wheels 151 (Figure 7) to their original position at the end of a multiplication operation, even though the return clutch 291 is disengaged by the repeat key 316. The bellcrank 296 has an arm extending diagonally upward toward the rear (Figure 12) to which is pivoted the link 175 (Figure 7) so that at the end of a multiplication when link 209 rocks bellcrank 296 clockwise in an attempt to rock bellcrank 292 and engage the return clutch 291, the link 175 is pulled downward which rocks the bail 174 counter-clockwise about shaft 109 to disengage pawls 171 from their respective ratchets 151. When this occurs the springs 151A rotate the ratchets counter-clockwise to their original position, whereupon they may be actuated step by step during a subsequent multiplication to effect disengagement of the main actuator clutch after a predetermined number of cycles thereof as described hereinbefore.

It will be remembered that the function of the return clutch is to return the setting member 76 to initial position, to clear the set-up from the multiplier control dials, and to disable the automatic control mechanism. As this clutch is not operated at the end of the operation when the repeat key is depressed, the automatic control remains enabled, the multiplier set-up remains in the register and the shiftable setting member remains in inoperative position, so the only operation necessary to start another multiplication with the same multiplier is to shift the carriage to the right past the highest order of the multiplier and to depress the plus or minus key, depending upon whether a positive or a negative operation is desired.

The return mechanism may be rendered operative upon restoration of the repeat key to raised position. To initiate operation of the return clutch to recondition the mechanism for another multiplying operation in which a different multiplier is used, the repeat key is raised. Tension spring 322 then becomes operative to rock parallel linkage 320-321 and arms 323 in a counterclockwise direction. Pin 323A contacts nose 324 which is not yieldable in this direction and so rocks bellcrank 292 to clutch engaging position whereby return clutch 291 is engaged and operates to recondition the multiplying mechanism in the manner hereinbefore described.

Operation

The operation of the multiplying mechanism disclosed herein will be first described in connection with a problem where the operator desires to set the entire multiplier into the machine before starting the operation. The machine is set for this type of operation by placing starting control lever 141 in its "Hold" position as shown in Figure 1. The other controls which must be set to control the operation are left and right tabulator stops 271, 276 and repeat key 316. As previously described under the heading of "Tabulator stop," handle 271 selects the order in which the highest order digit of the multiplier is entered, while handle 276 is set to the order in which it is desired to stop the operation.

If, for example, the multiplier has four places, and it is desired to start the operation with the accumulator carriage in its highest order position, left tabulator stop 271 is set in the highest order position, as shown in Figure 1, while right tabulator stop 276 is moved four orders from the left tabulator stop. If it is desired to use the same multiplier in successive multiplications, repeat key 316 is depressed.

The next step in the operation is to set the multiplicand and the multiplier into the machine, the multiplicand being set therein by means of numeral keys 1 (Figure 1) and the multiplier being set by means of multiplier keys 40 (Figures 1 and 2). As described under the heading of "Multiplier selection mechanism," each multiplier key 40 is adapted on depression thereof to set a differential member an amount corresponding to the value delineated on the depressed multiplier key and to engage selection clutch 57 (Figure 3).

Selection clutch 57 performs a plurality of operations during its single cycle of rotation in setting the first multiplier digit. Cam 56 integral therewith rocks lever 54 upwardly to contact slide 53, thereby rocking the lever system 66, 67, 68 and the shiftable member 76 to set the number in the multiplier control dials. During the last part of its upward movement lever 54 contacts the lever 89 (Figure 4) to release shiftable setting member 76 from segment 77 so it may shift to the next order. At the same time lever 54 contacts lever 191 (Figure 7) rocking the same upwardly to move bellcrank 179 under gate 177 to enable the automatic control mechanism. However, as starting control lever 141 is in its hold position, link 136 is in the position shown in Figure 7 in which nose 136A thereon is above the lateral extension 133C on arm 133 so that the operation is not started during the entry of the multiplier digits. When shiftable setting member 76 is restored to its uppermost position by spring 67A (Figure 3) it engages pawl 91 on bellcrank 92 and is thereby shifted into the next lower order where, upon subsequent depression of another multiplier key, a value is set in the manner described above. This operation continues until the entire multiplier figure is set into the multiplier control register.

With starting control lever 141 in its "Hold" position the operation of the machine is initiated by depression of plus key 28 or minus key 29 to determine either positive or negative digitation of the accumulator 3 (Figures 1 and 2). As previously described, depression of plus key 28 or minus key 29 rocks plate 31 (Figure 8) rearwardly, carrying therewith control link 33 to rock clutch release bellcrank 24 to clutch engaging position. Such rearward movement rocks shaft 32, linkage 137, 137A (Figure 7) to carry link 136 rearwardly so that nose 136A is positioned behind and latched by the extension 133C on arm 133. Thus the operation is initiated and the multiplicand is entered into the accumulator a number of times corresponding to the multiplier digit set in the highest order.

During each operation of the actuating mechanism, ratchet wheel 151 (Figure 7) in the controlling order is given one increment of advance by actuating pawl 153. The step by step advance of ratchet wheel 151 continues until extension 151B thereon contacts cam 72B on arcuate member 72 which has been set an amount proportional to the multiplier digit in that order. As arcuate member 72 is displaced, interponent 176 is rocked downwardly and rocks gate 177 and bell crank 189 downwardly thereby imparting clockwise movement to bellcrank 182. The clockwise movement of bellcrank 182 serves to disengage actuating clutch 23 and to engage shift clutch 201. As shown in Figure 8, lateral extension 182A on bellcrank 182 rocks integral levers 183, 186 to raise control link 33 and effect the disengagement of the actuator clutch 23. As shown in Figure 11, clockwise movement of bellcrank 182 also serves to move link 217 to the left, thereby positioning member 211 over lateral extension 208C on member 208, whereby cam 216, at the end of the actuating cycle, becomes operative to rock members 211, 208, 209, and 207 downwardly, whereby member 207, overlying the shift clutch control bellcrank 204, rocks the bellcrank 204 to clutch engaging position to initiate a shifting operation.

If the next lower order is set at zero, bail 177 is again depressed as the controlling mechanism enters that ordinal position whereby bellcrank 182 is again rocked in a clockwise direction moving link 217 to maintain members 207, 208, and 209 in depressed position whereby, as hereinbefore described, shift clutch 201 remains engaged for another cycle of operation. However, if a value greater than zero be set in the next lower order, the lever 176 is rocked upward and stud 177B moves upwardly to free interponent 236 and allow shoulder 236B to underlie the end of lever 183 so that when cam 231 on shift clutch 201 (Figure 9) rocks integral levers 232, 234 in a counter-clockwise direction, interponent 236 then engages arm 183 to rock said arm, and arm 185 integral therewith, in a counter-clockwise direction. Thus the clutch control bellcrank 24 (Figure 8) is rocked to clutch engaging position whereby the actuating mechanism performs a number of cycles of operation corresponding to the value of the multiplier digit set therein. This operation is repeated until the carriage enters the order in which the right tabulator stop 276 is positioned. When the shiftable accumulator carriage enters the position corresponding to the lowest order of the multiplier, cam 168 on shaft 167 (Figure 5) contacts cam extension 277A on right tabulator stop 276, rocking said stop and bail 278 in a counter-clockwise direction whereby link 281 (Figure 5) is moved rearwardly, rocking member 209 in a clockwise direction. Such movement of member 209 moves member 207 so that it moves from above lateral extension 204B on shift clutch control bellcrank 204, and overlies lateral extension 296B (Figure 12) on bellcrank 296 so that as members 207, 208, and 209 are moved downwardly, at the end of the operation in that order, bellcrank 296 and bellcrank 292 are rocked in a clockwise direction to engage return clutch 291 (Figures 5, 6, and 12). This operation occurs only if the repeat key is in raised position, because if said key is depressed, interponent 294 is moved out of engagement with clutch control bellcrank 292 (Figure 12) whereby the clockwise oscillation of bellcrank 296 is ineffective to engage the return clutch. In either event, however, the rocking of bellcrank 296 disengages pawls 171 from ratchet wheels 151 so said ratchets may return to their initial position, and unlatches 136 from 133 (Figure 7) to release the main clutch control mechanism so that restarting may be accomplished by depression of the plus bar or minus bar.

The operation of return clutch 291 serves to recondition the mechanism for a subsequent operation by restoring said mechanism to normal position. The automatic control mechanism is disabled thereby through the engagement of cam lug 307 (Figure 7) with bellcrank 179. Shiftable setting member 76 is returned to its initial position by said return clutch through cam 301 (Figures 5 and 6) rocking bellcrank 302 whereby bellcrank 92 is rocked to restore said shiftable setting member to its highest order position.

Another function of the operation of the return clutch 291 is to delatch the actuating clutch control mechanism. Cam 306 (Figure 7) contacts bellcrank 143 imparting a clockwise movement thereto, whereby arm 133 and link 136 are free to return to their forward position where they remain until a subsequent operation of an operation initiating control key.

If an operation is initiated with starting control lever 141 in its "Start" position, the initial operation of selection clutch 57 (Figure 7) also serves to engage the main clutch. As shown in Figure 7, when stepped slide 53 is moved rearwardly to a position corresponding to a value greater than zero, the nose of said slide underlies the forward arm of a bellcrank 131 so that upward movement thereof rocks said bellcrank in a clockwise direction whereby arm 133 and link 136 are moved rearwardly to operate the main clutch engaging means. The subsequent operation of the multiplying mechanism is the same as that hereinbefore set forth in the description relating to machine operation with starting control lever 141 in its "Hold" position, except that, if said mechanism completes the multiplying operation in one order before the operator sets a digit in the next lower order, the machine stops until such setting is made. As shown in Figures 10 and 15, arm 251 carries a bent ear 252 which is always positioned in the next lower order from that in which the machine is operating. If said next lower order is in its blank position, ear 252 encounters lug 102A on knurled disc 102, rocking arm 251, gate 253, and bellcank 256 to move link 257 to the left thereby withdrawing member 207 to the position shown in Figure 10. In such position, member 207 is inoperative upon downward movement thereof, as determined by cam 216 driven in time with the actuating mechanism, to engage shift clutch 201. Upon a subsequent entering of a number in said next lower order, shift clutch 201 is engaged through the restoration of bellcrank 256 and link 257 to their right hand position wherein link 207 is moved downwardly to engage the shift clutch and the operation proceeds as hereinbefore described.

I claim:

1. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, means comprising primary and advance sensing elements sequentially shiftable by said displacing means into cooperative relationship with successive pairs of said devices, means for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, and means controlled by the advance sensing element of said shiftable means for disabling the aforesaid connections.

2. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, means comprising primary and advance sensing elements sequentially shiftable by said displacing means into cooperative relationship with successive pairs of said devices, means for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, means controlled by the advance sensing element of said shiftable means for disabling the aforesaid connections, and means also controlled by said advance sensing element and operable in response to a setting movement of a predetermined character of the device in cooperative relationship therewith for causing the displacing means to effect denominational displacement of said accumulating mechanism with respect to said actuating mechanism after said connections have been disabled as aforesaid.

3. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, means comprising primary and advance sensing elements sequentially shiftable by said displacing means into cooperative relationship with successive pairs of said devices, means for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, means actuated by said displacing means for actuating the aforesaid operation controlling means to reinitiate operation of the accumulating mechanism by the actuating mechanism, and means controlled by the advance sensing element of said shiftable means for disabling the aforesaid connections.

4. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, means comprising primary and advance sensing elements sequentially shiftable by said displacing means into cooperative relationship with successive pairs of said devices, means for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect a plurality of sequential denominational displacements of said accumulating mechanism with respect to said actuating mechanism, means actuated by said displacing means for actuating the aforesaid operation controlling means to reinitiate operation of the accumulating mechanism by the actuating mechanism, means controlled by said primary sensing element for disabling said last named actuating means during sequential denominational displacements of said accumulating mechanism with respect to said actuating mechanism, and means controlled by the advance sensing element of said shiftable means for disabling the aforesaid connections.

5. In a motor driven calculating machine the combination with differential actuating mechanism, accumulating mechanism operable thereby, means for controlling the operation of said accumulating mechanism by said actuating mechanism, menas for denominationally displacing said accumulating mechanism with respect to said actuating mechanism, of automatic control mechanism including a series of differentially settable devices, means comprising primary and advance sensing elements sequentially shiftable by said displacing means into cooperative relationship with successive pairs of said devices, means for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, means actuated by said displacing means for actuating the aforesaid operation controlling means to reinitiate operation of the accumulating mechanism by the actuating mechanism, means controlled by the advance sensing element of said shiftable means for disabling the aforesaid connections, and means also controlled by said advance sensing element and operable in response to a setting movement of a predetermined character of the device in cooperative relationship therewith for causing the displacing means to effect denominational displacement of said accumulating mechanism with respect to said actuating mechanism after said connections have been disabled as aforesaid.

6. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, setting means for said devices comprising a series of depressible keys and power operated mechanism controlled by said keys for differentially setting said devices; means comprising primary and advance sensing elements sequentially shiftable by said displacing means into cooperative relationship with successive pairs of said devices, means controlled by said keys for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, and means controlled by the advance sensing element of said shiftable means for disabling the aforesaid connections.

7. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, setting means for said devices comprising a series of depressible keys and power operated mechanism controlled by said keys for differentially setting said devices; means comprising primary and advance sensing elements sequentially shiftable by said displacing means into cooperative relationship with successive pairs of said devices, means controlled by said keys for actuating the aforesaid operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, means actuated by said displacing means for actuating the aforesaid operation controlling means to reinitiate operation of the accumulating mechanism by the actuating mechanism, and means controlled by the advance sensing element of said shiftable means for disabling the aforesaid connections.

8. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, setting means for said devices comprising a series of depressible keys and power operated mechanism controlled by said keys for differentially setting said devices; means comprising primary and advance sensing elements sequentially shiftable by said displacing means into cooperative relationship with successive pairs of said devices, means controlled by said keys for actuating the aforesaid operation controlling means to initiate operation of the accumulating mechanism by the actuating mechanism, settable means for disabling said key controlled actuating means, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, and means controlled by the advance sensing element of said shiftable means for disabling the aforesaid connections.

9. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, setting means for said devices comprising a series of depressible keys and power operated mechanism controlled by said keys for differentially setting said devices; means comprising primary and advance sensing elements sequentially shiftable by said displacing means into cooperative relationship with successive pairs of said devices, means controlled by said keys for actuating the aforesaid operation controlling means to initiate operation of the accumulating mechanism by the actuating mechanism, settable means for disabling said key controlled actuating means, means operable while said settable means is set so as to disable said key controlled actuating means for actuating the operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, and means controlled by the advance sensing element of said shiftable means for disabling the aforesaid connections.

10. In a motor driven calculating machine the combination with differential actuating mechanism, accumulating mechanism operable thereby, means for controlling the operation of said accumulating mechanism by said actuating mechanism, means for denominationally displacing said accumulating mechanism with respect to said actuating mechanism, of automatic control mechanism including a series of differentially settable devices, setting means for said devices comprising a series of depressible keys and power operated mechanism controlled by said keys for differentially setting said devices; means comprising primary and advance sensing elements sequentially shiftable by said displacing means into cooperative relationship with successive pairs of said devices, means controlled by said keys for actuating the aforesaid operation controlling means to initiate operation of the accumulating mechanism by the actuating mechanism, settable means for disabling said key controlled actuating means, means operable while said settable means is set so as to disable said key controlled actuating means for actuating the operation controlling means to initiate operation of the accumulating mechanism by the actuating mechanism, means controlled by the primary sensing element of said shiftable means for causing the aforesaid controlling means to interrupt operation of the accumulating mechanism by the actuating mechanism, connections also controlled by said primary sensing element of said shiftable means for causing the aforesaid displacing means to effect denominational displacement of said accumulating mechanism with respect to said actuating mechanism, means actuated by said displacing means for actuating the aforesaid operation controlling means to reinitiate operation of the accumulating mechanism by the actuating mechanism, and means controlled by the advance sensing element of said shiftable means for disabling the aforesaid connections.

11. An automatic control mechanism for motor driven calculating machines, comprising a series of differentially settable devices, power operated mechanism for resetting said devices, means operated by power derived from the motor for initiating operation of said mechanism, settable means for rendering said power operated means ineffective to initiate operation of said mechanism, and means controlled by said settable means upon restoration thereof from set position for initiating operation of said mechanism.

12. In a motor driven calculating machine the combination with differential actuating mechanism, accumulating mechanism operable thereby, means for controlling operation of said accumulating mechanism by said actuating mechanism, and means for denominationally displacing said accumulating mechanism with respect to said actuating mechanism; of automatic multiplication control mechanism including a series of devices each differentially settable from a base position, means including a series of depressible multiplier keys for successively setting said devices, each a differential amount determined by a depressed one of said multiplier keys, means controlled by said keys for actuating said operation controlling means to initiate operation of said accumulating mechanism by said actuating mechanism, sensing means comprising a sensing element sequentially shiftable into cooperative relationship with successive ones of said devices, control means operable in timed relation with said actuating mechanism and movable from a base position a differential amount determined by the setting of one of said devices for causing said one device to actuate said sensing means, means controlled by said sensing means upon actuation thereof by said one device for causing said controlling means to interrupt operation of said accumulating mechanism by said actuating mechanism, means controlled by said sensing element for causing said displacing means to effect denominational displacement of said accumulating mechanism with respect to said actuating mechanism and to shift said sensing element from cooperative relationship with one of said devices to cooperative relationship with a next one of said devices, means responsive to operation of said displacing means for causing said controlling means to resume operation of said accumulating mechanism by said actuating mechanism, and means separate from said sensing means and controlled by said next one of said devices when set in a predetermined manner for disabling said displacing control means.

13. In a motor driven calculating machine the combination with differential actuating mechanism, accumulating mechanism operable thereby, means for controlling operation of said accumulating mechanism by said actuating mechanism, and means for denominationally displacing said accumulating mechanism with respect to said actuating mechanism; of automatic control mechanism including a series of devices, each differentially settable from a base position, means including a series of depressible multiplier keys for successively setting said devices, each a differential amount determined by a depressed one of said multiplier keys, means controlled by said keys for actuating said operation controlling means to initiate operation of said accumulating mechanism by said actuating mechanism, sensing means comprising a sensing element sequentially shiftable into cooperative relationship with successive ones of said devices, control means operable in timed relation with said actuating mechanism and movable from a base position a differential amount determined by the setting of one of said devices for causing said one device to actuate said sensing means, means controlled by said sensing means upon actuating thereof by said control means for causing said controlling means to interrupt operation of said accumulating mechanism by said actuating mechanism, means controlled by said sensing element for causing said displacing means to effect denominational displacement of said accumulating mechanism with respect to said actuating mechanism and to shift said sensing element from cooperative relationship with one of said devices to cooperative relationship with a next one of said devices, means controlled by said displacing means for causing said controlling means to resume operation of said accumulating mechanism by said actuating mechanism, and means separate from said sensing means and controlled by said next one of said devices when set in a predetermined setting for disabling said last mentioned means on displacement of said accumulating mechanism as aforesaid.

14. In a motor driven calculating machine, the combination with differential actuating mechanism, accumulating mechanism operable thereby, means for controlling operation of said accumulating mechanism by said actuating mechanism, means for denominationally displacing said accumulating mechanism with respect to said actuating mechanism; of automatic control mechanism including a series of differentially settable devices, means comprising primary and advance sensing elements sequentially shiftable by said displacing means into cooperative relationship with successive pairs of said devices, means for actuating the aforesaid operation controlling means to initiate operation of said accumulating mechanism by said actuating mechanism, means controlled by said primary sensing element for causing said controlling means to interrupt operation of said accumulating mechanism by said actuating mechanism, means responsive to said controlling means upon interruption of operation of said accumulating mechanism thereby for causing said displacing means to effect denominational displacement of said accumulating mechanism with respect to said actuating mechanism, and means controlled by said advance sensing element for disabling said last mentioned means.

15. In a motor driven calculating machine the combination with differential actuating mechanism, accumulating mechanism operable thereby, means for controlling operation of said accumulating mechanism by said actuating mechanism, means for denominationally displacing said accumulating mechanism with respect to said actuating mechanism; of automatic control mechanism including a series of differentially settable devices each settable from a base position, setting means for said devices comprising a series of depressible keys and means controlled by said keys for successively setting said devices from a base position; means controlled by said keys for actuating said operation controlling means to initiate operation of said accumulating mechanism by said actuating mechanism, sensing means comprising a sensing element sequentially shiftable by said displacing means into cooperative relationship with successive ones of said devices, means controlled by said sensing means for causing said controlling means to interrupt operation of said accumulating mechanism by said actuating mechanism, displacing control means responsive to said successive ones of said devices upon interruption of operation of said accumulating mechanism by said last mentioned means for causing said displacing means to effect denominational displacement of said accumulating mechanism with respect to said actuating mechanism and to shift said sensing element from cooperative relationship with one of said devices to cooperative relationship with a next one of said devices, means separate from said sensing means and controlled by said next one of said devices when in said base position for disabling said displacing control means, and means also controlled by said next one of said devices and operable in response to a setting movement thereof of a predetermined character for reenabling said displacing control means when the same has been disabled as aforesaid.

16. In a motor driven calculating machine the combination with differential actuating mechanism, accumulating mechanism operable thereby, means for controlling operation of said accumulating mechanism by said actuating mechanism, a control train for said last mentioned means settable to controlling position; of automatic control mechanism including a series of differentially settable devices, setting means for said devices comprising a series of depressible keys and a cyclically operable clutch operable in response to depression of each of said keys for entering the values of said keys into successive ones of said devices; means operable by said clutch upon the first cycle of operation thereof for setting said control train to said controlling position, means comprising a sensing element sequentially shiftable into cooperative relationship with each of said devices, means for shifting said sensing element, means controlled by said sensing element for disabling said control train, means responsive to disabling of said control train for shifting said sensing element from cooperative relationship with one of said devices to cooperative relationship to a next one of said devices, means actuated by said last mentioned means for reenabling said train, and means responsive to a predetermined shifting movement of said sensing element for releasing said control train from said controlling position.

17. In a motor driven calculating machine the combination wtih differential actuating mechanism, accumulating mechanism operable thereby, means for controlling operation of said accumulating mechanism by said actuating mechanism, means for denominationally displacing said accumulating mechanism with respect to said actuating mechanism; of automatic control mechanism including a series of devices, each differentially settable from a base position, setting means comprising a series of depressible multiplier keys for setting each of said devices a differential amount determined by a depressed one of said multiplier keys, and means controlled by said keys for successively setting said devices from their base positions; means controlled by said keys for actuating said operation controlling means to initiate operation of said accumulating mechanism by said actuating mechanism, sensing means comprising a sensing element sequentially shiftable by said displacing means into cooperative relationship with successive ones of said devices, control means operable in timed relation with said actuating mechanism and movable from a base position a differential amount determined by the setting of one of said devices for causing said one device to actuate said sensing means, means controlled by said sensing means upon actuation thereof by said control means for causing said controlling means to interrupt operation of said accumulating mechanism by said actuating mechanism, displacing control means responsive to said successive ones of said devices upon interruption of operation of said accumulating mechanism by said last mentioned controlled means for causing said displacing means to effect denominational displacement of said accumulating mechanism with respect to said actuating mechanism to shift said sensing element from cooperative relationship with one of said devices to cooperative relationship with a next one of said devices and to cause resumption of the operation of said accumulating mechanism by said actuating mechanism, and means separate from said sensing means and controlled by said next one of said devices when in said base position for preventing resumption of operation of said accumulating mechanism by said actuating mechanism.

18. In a motor driven calculating machine the combination with differential actuating mechanism, accumulating mechanism operable thereby, means for controlling operation of said accumulating mechanism by said actuating mechanism, means for denominationally displacing said accumulating mechanism with respect to said actuating mechanism; of automatic control mechanism including a series of devices, each differentially settable from a base position, setting means comprising a series of depressible multiplier keys for setting each of said devices a differential amount determined by a depressed one of said multiplier keys, and means controlled by said keys for successively setting said devices from their base positions; means controlled by said keys for actuating said operation controlling means to initiate operation of said accumulating mechanism by said actuating mechanism, sensing means comprising a sensing element sequentially shiftable by said displacing means into cooperative relationship with successive ones of said devices, control means operable in timed relation with said actuating mechanism and movable from a base position a differential amount determined by the setting of one of said devices for causing said one device to actuate said sensing means, means controlled by said sensing means upon actuation thereof by said control means for causing said controlling means to interrupt operation of said accumulating mechanism by said actuating mechanism, control means responsive to said successive ones of said devices upon interruption of operation of said accumulating mechanism by said last mentioned controlled means for initiating a sequence of operations including actuation of said displacing means to effect denominational displacement of said accumulating mechanism with respect to said actuating mechanism, shifting of said sensing element from cooperative relationship with one of said devices to cooperative relationship with a next one of said devices and resumption of the operation of said accumulating mechanism by said actuating mechanism; and means separate from said sensing means and controlled by said next one of said devices when in a predetermined position for interrupting said sequence of operations.

HAROLD T. AVERY.